(12) United States Patent
Isaac et al.

(10) Patent No.: US 12,483,871 B2
(45) Date of Patent: Nov. 25, 2025

(54) SYSTEMS AND METHODS FOR AUTOMATIC BREAKDOWN DETECTION AND ROADSIDE ASSISTANCE

(71) Applicant: Allstate Insurance Company, Northbrook, IL (US)

(72) Inventors: Emad S. Isaac, Downers Grove, IL (US); Tao Chen, Northbrook, IL (US); Manjunath Rao, Wheeling, IL (US); Umamaheshwar R. Uppada, Palatine, IL (US); Rodolfo Roberto Ballesteros, Aurora, IL (US); Stephen Robert Newell, Belfast (GB)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 18/387,334

(22) Filed: Nov. 6, 2023

(65) Prior Publication Data

US 2024/0155314 A1    May 9, 2024

Related U.S. Application Data

(63) Continuation of application No. 17/345,270, filed on Jun. 11, 2021, now Pat. No. 11,849,375, which is a
(Continued)

(51) Int. Cl.
*H04W 4/44* (2018.01)
*G07C 5/00* (2006.01)
(Continued)

(52) U.S. Cl.
CPC .............. *H04W 4/44* (2018.02); *G07C 5/008* (2013.01); *G07C 5/0816* (2013.01); *G08G 1/127* (2013.01)

(58) Field of Classification Search
None
See application file for complete search history.

(56) References Cited

U.S. PATENT DOCUMENTS 7,119,669 B2  10/2006  Lundsgaard et al.
8,019,629 B1   9/2011  Medina, III et al.
(Continued)

FOREIGN PATENT DOCUMENTS

EP        2955484 A1    12/2015
WO    WO-2014134148 A2   9/2014
WO    WO-2014134148 A3  10/2014

OTHER PUBLICATIONS

Aug. 18, 2016—(US) Non-Final Office Action—U.S. Appl. No. 15/182,955, 19 pages.
(Continued)

*Primary Examiner* — Thomas S McCormack

(57) ABSTRACT

Systems and methods in accordance with embodiments of the invention can proactively determine if an individual is likely in need of roadside assistance. Information can be collected from the individual's phone, including the person's location, the type of road, ambient noise, and/or motion of nearby objects. If it is determined that the individual likely needs roadside assistance, the system can proactively contact the individual to see if roadside assistance is desired, and if so, initiates roadside assistance. The system also can provide helpful information, such as safety information, and/or automatically contact other individuals to alert them of the roadside event and the location of the individual.

20 Claims, 14 Drawing Sheets

Related U.S. Application Data continuation of application No. 16/747,965, filed on Jan. 21, 2020, now Pat. No. 11,064,324, which is a continuation of application No. 16/426,663, filed on May 30, 2019, now Pat. No. 10,582,354, which is a continuation-in-part of application No. 16/152,739, filed on Oct. 5, 2018, now Pat. No. 10,560,823.

(51) Int. Cl.
*G07C 5/08* (2006.01)
*G08G 1/127* (2006.01)

(56) References Cited

U.S. PATENT DOCUMENTS

| | | | |
|---|---|---|---|
| 8,332,242 | B1 | 12/2012 | Medina, III |
| 8,862,092 | B2 | 10/2014 | Reitnour |
| 9,581,461 | B1 | 2/2017 | Chintakindi et al. |
| 9,767,625 | B1 | 9/2017 | Snyder et al. |
| 9,771,082 | B2 | 9/2017 | Farrell et al. |
| 9,773,281 | B1 | 9/2017 | Hanson |
| 9,818,239 | B2 | 11/2017 | Pal et al. |
| 9,832,241 | B1 | 11/2017 | Hayward |
| 9,955,319 | B2 | 4/2018 | Matus et al. |
| 10,036,650 | B2 | 7/2018 | Chintakindi et al. |
| 10,077,056 | B1 | 9/2018 | Fields et al. |
| 10,246,037 | B1 | 4/2019 | Shea et al. |
| 10,853,354 | B2 | 12/2020 | Quick et al. |
| 2002/0016667 | A1 | 2/2002 | Baur et al. |
| 2003/0060977 | A1 | 3/2003 | Jijina et al. |
| 2008/0082261 | A1 | 4/2008 | Tengler et al. |
| 2009/0271325 | A1 | 10/2009 | Wilson |
| 2011/0077028 | A1 | 3/2011 | Wilkes, III et al. |
| 2012/0123806 | A1 | 5/2012 | Schumann, Jr. et al. |
| 2012/0166229 | A1 | 6/2012 | Collins et al. |
| 2013/0069802 | A1 | 3/2013 | Foghel et al. |
| 2013/0226441 | A1 | 8/2013 | Horita |
| 2014/0062725 | A1 | 3/2014 | Maston |
| 2014/0074402 | A1 | 3/2014 | Hassib et al. |
| 2014/0266789 | A1 | 9/2014 | Matus |
| 2014/0277935 | A1 | 9/2014 | Daman et al. |
| 2015/0015418 | A1* | 1/2015 | Stanek ............... G08G 1/09626 340/901 |
| 2015/0084757 | A1 | 3/2015 | Annibale et al. |
| 2015/0127388 | A1 | 5/2015 | Oldham |
| 2016/0086285 | A1 | 3/2016 | Jordan Peters et al. |
| 2016/0104328 | A1 | 4/2016 | Chen et al. |
| 2016/0171521 | A1 | 6/2016 | Ramirez et al. |
| 2016/0171621 | A1 | 6/2016 | Bogovich et al. |
| 2016/0232797 | A1 | 8/2016 | Wiesemann et al. |
| 2016/0358477 | A1 | 12/2016 | Ansari |
| 2017/0164158 | A1 | 6/2017 | Watkins et al. |
| 2017/0221149 | A1 | 8/2017 | Hsu-Hoffman et al. |
| 2018/0077538 | A1* | 3/2018 | Matus ................. G08B 25/016 |
| 2018/0089605 | A1 | 3/2018 | Poornachandran et al. |
| 2018/0253956 | A1* | 9/2018 | Nygren .................. G01P 15/18 |

OTHER PUBLICATIONS

Aug. 30, 2016—(US) Non-Final Office Action—U.S. Appl. No. 15/182,920, 15 pages.
Dec. 19, 2016—(US) Final Office Action—U.S. Appl. No. 15/182,955, 19 pages.
Oct. 26, 2016—(US) Notice of Allowance—U.S. Appl. No. 15/182,920, 9 pages.
Aug. 2, 2017—(US) Final Office Action—U.S. Appl. No. 15/182,955, 8 pages.
Mar. 27, 2017—(US) Non-Final Office Action—U.S. Appl. No. 15/182,955, 24 pages.
Nov. 17, 2017—(US) Non-Final Office Action—U.S. Appl. No. 15/409,693, 19 pages.
Oct. 30, 2017—(US) Notice of Allowance—U.S. Appl. No. 15/182,955, 5 pages.
Mar. 30, 2018—(US) Notice of Allowance—U.S. Appl. No. 15/409,693, 9 pages.
Jun. 21, 2019 (US) Non-Final Office Action—U.S. Appl. No. 16/152,739, 14 pages.
Jun. 28, 2019—(US) Non-Final Office Action—U.S. Appl. No. 16/426,663, 15 pages.
May 9, 2019—(CA) Office Action—Application No. 3010433, 6 pages.
Oct. 21, 2019—(US) Notice of Allowance—U.S. Appl. No. 16/426,663, 22 pages.
Sep. 16, 2019—(US) Non-Final Office Action—U.S. Appl. No. 15/883,986, 30 pages.
Sep. 25, 2019—(US) Notice of Allowance—U.S. Appl. No. 16/152,739, 13 pages.
Aug. 7, 2020—(US) Non-Final Office Action—U.S. Appl. No. 16/747,965, 9 pages.
Dec. 3, 2020—(US) Final Office Action—U.S. Appl. No. 15/883,986, 20 pages.
Dec. 21, 2020—(IN) Examination Report—Application No. 201827025677, 7 pages.
Feb. 24, 2020—(US) Non-Final Office Action—U.S. Appl. No. 16/023,196, 18 pages.
Jun. 18, 2020—(US) Non-Final Office Action—U.S. Appl. No. 15/883,986, 29 pages.
Jun. 30, 2020—(CA) Notice of Allowance—App. No. 3,010,433, 1 page.
Jun. 8, 2020—(EP) Office Action—App. No. 17736191.2, 07 Pages.
Mar. 10, 2020—(US) Final Office Action—U.S. Appl. No. 15/883,986, 25 pages.
May 14, 2020—(US) Notice of Allowance—U.S. Appl. No. 16/023,196, 14 pages.
Nov. 18, 2020—(IN) 1st Examination Report—App. No. 20187025309, 8 pages.
Apr. 6, 2021—(US) Notice of Allowance—U.S. Appl. No. 16/747,965, 35 pages.
Jan. 27, 2021—(US) Final Office Action—U.S. Appl. No. 16/747,965, 8 pages.
May 7, 2021—(US) Notice of Allowance—U.S. Appl. No. 15/883,986, 9 pages.
Ali H.M., et al., "Car Accident Detection and Notification System Using Smartphone," International Journal of Computer Science and Mobile Computing (IJCSMC), vol. 4 (4), Apr. 2015, pp. 620-635.
Extended European Search Report for European Application No. 17736191.2 dated Jul. 12, 2019, 11 pages.
Extended European Search Report for European Application No. 17736197.9 dated Aug. 1, 2019, 10 pages.
International Preliminary Report on Patentability for International Application No. PCT/US2019/054540, mailed Apr. 15, 2021, 6 pages.
International Search Report and Written Opinion for International Application No. PCT/US2017/012016, mailed Feb. 2, 2017, 12 pages.
International Search Report and Written Opinion for International Application No. PCT/US2017/012029, mailed Feb. 6, 2017, 9 pages.
International Search Report and Written Opinion for International Application No. PCT/US2019/054540, mailed Nov. 14, 2019, 7 pages.
Kumar B., et al., "Automatic Vehicle Accident Detection and Rescue System," International Journal for Research in Applied Science & Engineering Technology (IJRASET), vol. 4 (IV), Apr. 2016, pp. 592-596.
Priyanga R., et al., "Sensor Based Accident Detection and Prevention Technology," International Journal of Advanced Technology in Engineering and Science, vol. 2 (11), Nov. 2014, pp. 156-161.
Sany S.A., et al., "IoT Based Vehicle Accident Detection & Rescue Information System," Department of Computer Science & Engineering (CSE), East West University, Dhaka, Bangladesh, Aug. 2017, 66 pages.

\* cited by examiner

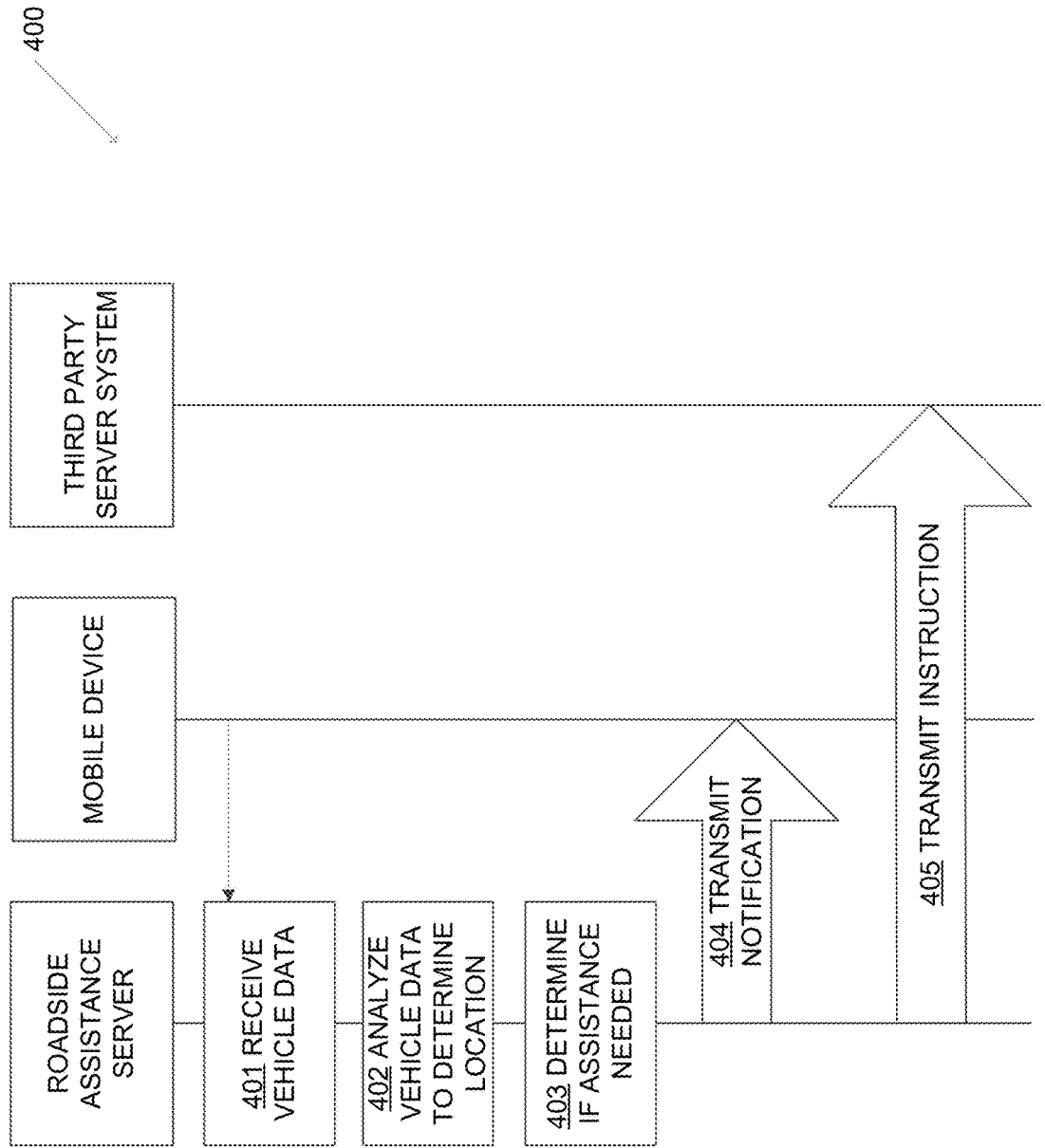

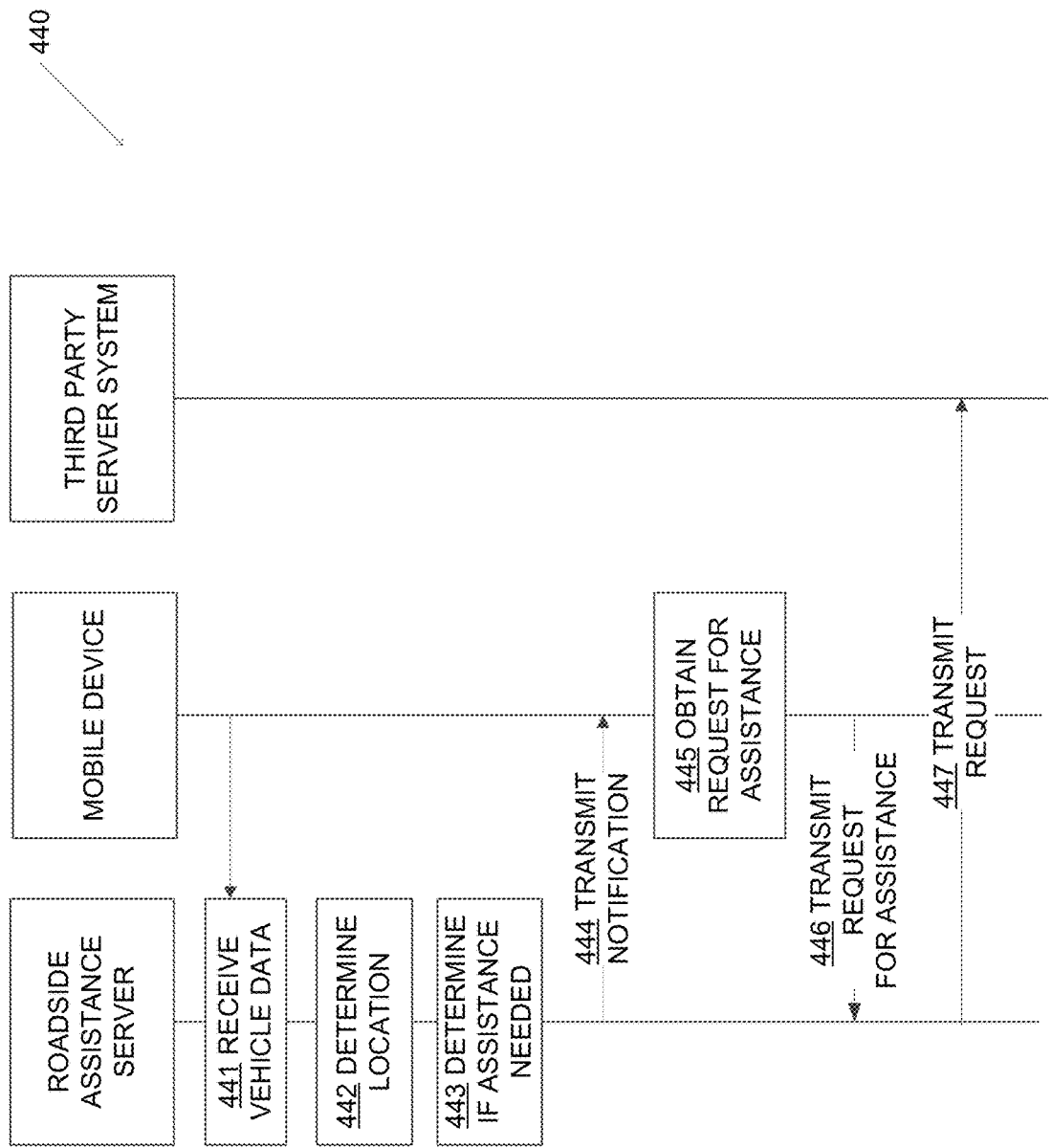

950

We noticed you have stopped unexpectedly.

Is everything OK?

[ No ]   [ Yes ]

Would you like us to request roadside assistance?

[ No ]   [ Yes ]

Would you like information about food,
lodging, points of interest in the area?

[ No ]   [ Yes ]

FIG. 9B

SYSTEMS AND METHODS FOR AUTOMATIC BREAKDOWN DETECTION AND ROADSIDE ASSISTANCE

CROSS-REFERENCE TO RELATED APPLICATIONS

The instant application is a continuation of U.S. patent application Ser. No. 17/345,270, titled "Systems and Methods for Automatic Breakdown Detection and Roadside Assistance" and filed Jun. 11, 2021, which is a continuation of U.S. patent application Ser. No. 16/747,965, titled "Systems and Methods for Automatic Breakdown Detection and Roadside Assistance" and filed Jan. 21, 2020, which is a continuation of U.S. patent application Ser. No. 16/426,663, titled "Systems and Methods for Automatic Breakdown Detection and Roadside Assistance" and filed May 30, 2019 and issued as U.S. Pat. No. 10,582,354 on Mar. 3, 2020, which is a continuation-in-part of U.S. patent application Ser. No. 16/152,739, titled "Systems and Methods for Roadside Assistance" and filed Oct. 5, 2018 and issued as U.S. Pat. No. 10,560,823 on Feb. 11, 2020. Each of these applications is incorporated by reference in its entirety herein.

FIELD OF INVENTION

Aspects of the disclosure relate to data processing systems and more specifically to processing vehicular data.

BACKGROUND

Vehicles, such as automobiles, can stop along a roadside for various different reasons such as a rest stop, because the driver has missed an exit, or for various emergency reasons, such as a flat tire, low fuel, or other mechanical issues. Obtaining roadside assistance can be difficult when in an unfamiliar area. Conventional systems can offer roadside assistance but often do not distinguish between vehicles being stopped for an urgent situation or a non-urgent situation.

SUMMARY OF THE INVENTION

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Systems and methods in accordance with embodiments of the invention can proactively determine if an individual is likely in need of roadside assistance. Information can be collected from the individual's phone, including the person's location, the type of road, passing vehicles, and/or ambient noise. The likelihood of needing roadside assistance can be determined based on a configurable probability that the individual's vehicle is experiencing a roadside event. If it is determined that the individual likely needs roadside assistance, the system can proactively contact the individual to see if roadside assistance is desired, and if so, initiates roadside assistance. The system also can provide helpful information, such as safety information, and/or automatically contact other individuals to alert them of the roadside event and the location of the individual.

The arrangements described can also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which:

FIGS. 4A-C illustrate example event sequences in accordance with embodiments of the invention;

FIGS. 9A-C illustrate example user interfaces for providing notifications in accordance with embodiments of the invention.

DETAILED DESCRIPTION

Figure 1:
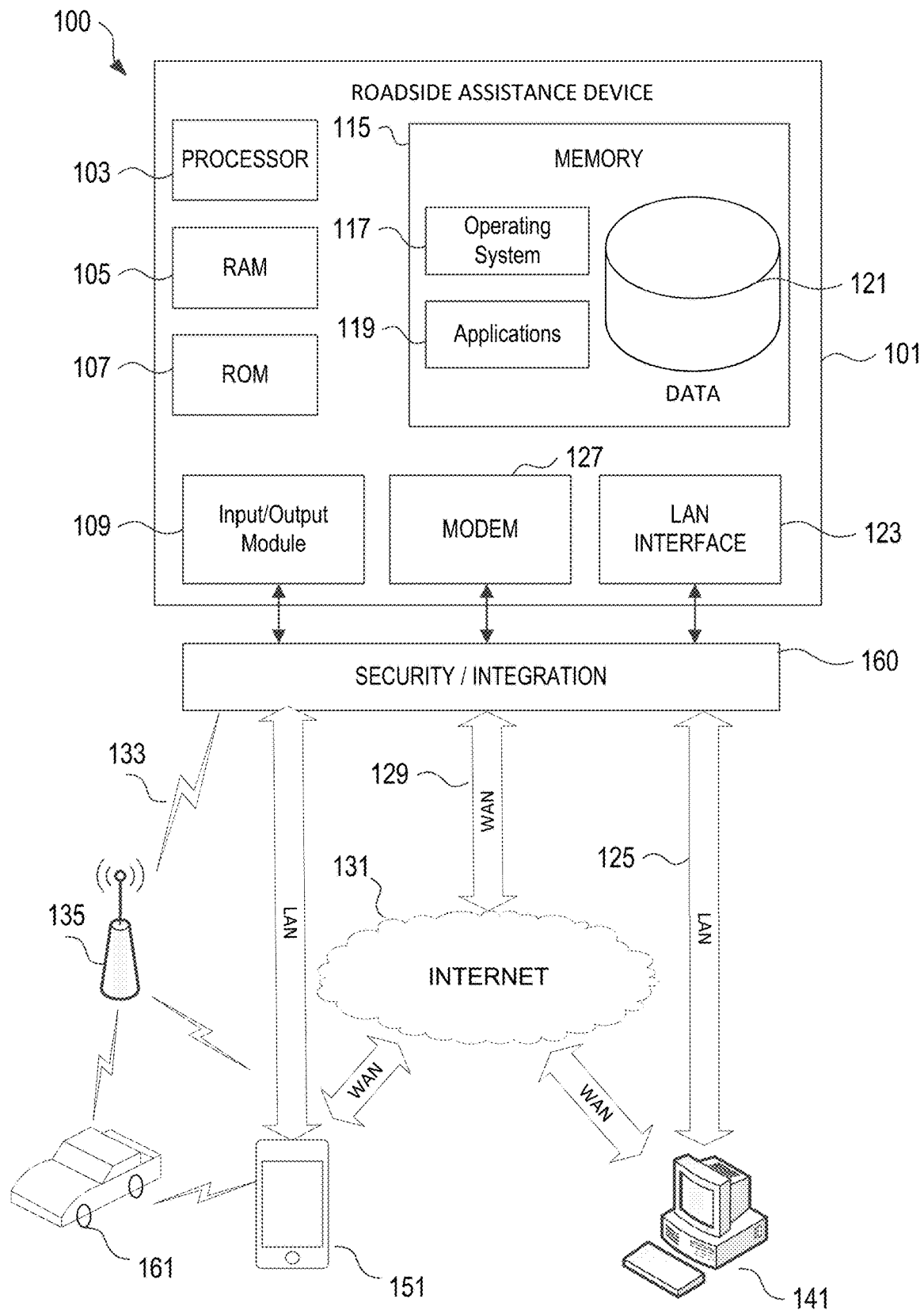
FIG. 1 illustrates one example operating environment in which one or more aspects described herein can be implemented.

In the following description of the various embodiments, reference is made to the accompanying drawings, which form a part hereof, and in which is shown by way of illustration, various embodiments of the disclosure that can be practiced. It is to be understood that other embodiments can be utilized.

As will be appreciated by one of skill in the art upon reading the following disclosure, various aspects described herein can be embodied as a method, a computer system, or a computer program product. Accordingly, those aspects can take the form of an entirely hardware embodiment, an entirely software embodiment, or an embodiment combining software and hardware aspects. Furthermore, such aspects can take the form of a computer program product stored by one or more computer-readable storage media having computer-readable program code, or instructions, embodied in or on the storage media. Any suitable computer-readable storage media can be utilized, including hard disks, CD-ROMs, optical storage devices, magnetic storage devices, and/or any combination thereof. In addition, various signals representing data or events as described herein can be transferred between a source and a destination in the form of electromagnetic waves traveling through signal-conducting media such as metal wires, optical fibers, and/or wireless transmission media (e.g., air and/or space).

As will be discussed more fully herein, arrangements described herein are directed to determining a location of a vehicle, determining a reason the vehicle is stopped, and generating and transmitting one or more different types of notifications. Conventional roadside assistance systems often require a user to provide information about an issue that has occurred, request assistance, or the like. If stopped in an emergency situation on a highway, this can be difficult for a user and sometimes dangerous. Accordingly, it is advantageous to detect issues that have caused a vehicle to stop along a highway and automatically provide assistance if the reason for stopping is urgent or provide an offer of assistance or additional information if the reason for stopping is not urgent. Additionally, conventional roadside assistance systems typically utilize specialized hardware installed in the vehicle. The use of specialized hardware limits the number of vehicles that can be utilized and requires drivers to invest in expensive hardware in order to obtain roadside assistance.

Systems and methods in accordance with embodiments of the invention can proactively determine if an individual is likely in need of roadside assistance. Roadside assistance can be provided for any kind of road, such as local routes, state routes, rural routes, etc. Information can be collected from the individual's mobile device, including the person's location, the type of road, and/or ambient noise. One aspect to be considered during the detection roadside assistance can include observing a user's physical activities/movements during the incident. These physical activities can include, but are not limited to, determining if the user stepped out of vehicle, the location of the user relative to the vehicle, and determining the status of the vehicle (tire pressure, trunk open, hood open, etc.). In many embodiments, machine learning algorithms can be utilized to determine a likelihood that a user is engaged in one or more activities activity by analyzing one or more sensors (gyroscope, accelerometer, GPS, etc.) in the user's mobile device.

By utilizing the individual's mobile device, roadside assistance can be provided to any vehicle without the need for dedicated systems to be installed in the vehicle. If it is determined that the individual likely needs roadside assistance, the system can proactively contact the individual to see if roadside assistance is desired, and if so, initiates roadside assistance. The likelihood of needing roadside assistance can be determined based on a configurable probability that the individual's vehicle is experiencing a roadside event. A variety of data, including the motion of wireless devices in proximity to the vehicle, can be used to determine a probability that a roadside event has occurred. The system also can provide helpful information, such as safety information, and/or automatically contact other individuals, such as family members, friends, and/or co-workers, to alert them of the roadside event and the location of the individual. The alerts can be used to automatically initiate roadside assistance for the vehicle and/or contact the individual.

These and various other arrangements will be described more fully herein.

Roadside Assistance Systems

FIG. 1 illustrates a block diagram a roadside assistance device 101 in a roadside assistance system 100 in accordance with an embodiment of the invention. The roadside assistance device 101 can have a processor 103 for controlling overall operation of the device 101 and its associated components, including RAM 105, ROM 107, input/output module 109, and memory 115. The roadside assistance device 101, along with one or more additional devices (e.g., terminal 141, mobile device 151, and/or security and integration hardware 160) can correspond to any of multiple systems or devices described herein, such as personal mobile devices, vehicle-based computing devices, insurance systems servers, roadside assistance provider servers, roadside assistance servers, internal data sources, external data sources and other various devices in a roadside assistance system. These various computing systems can be configured individually or in combination, as described herein, for receiving signals and/or transmissions from one or more computing devices, the signals or transmissions including data related to location of a vehicle, operating parameters of a vehicle, and the like, processing the signals or transmissions to determine a location of the vehicle, operating parameters of the vehicle, a cause of an issue associated with the vehicle, and the like, using the devices of the roadside assistance systems described herein. In addition to the features described above, the techniques described herein also can be used for generating and displaying one or more different types of notifications, transmitting a request for assistance to a service center computing device, and the like.

Input/output (I/O) 109 can include a microphone, keypad, touch screen, and/or stylus through which a user of the roadside assistance device 101 can provide input, and can also include one or more of a speaker for providing audio output and a video display device for providing textual, audiovisual, and/or graphical output. Software can be stored within memory 115 and/or storage to provide instructions to processor 103 allowing roadside assistance device 101 to perform various actions. For example, memory 115 can store software used by the device 101, such as an operating system 117, application programs 119, and/or an associated internal database 121. The various hardware memory units in memory 115 can include volatile and nonvolatile, removable and non-removable media implemented in any method or technology for storage of information such as computer-readable instructions, data structures, program modules or other data. Certain devices and systems within roadside assistance systems can have minimum hardware requirements in order to support sufficient storage capacity, processing capacity, analysis capacity, network communication, etc. Memory 115 also can include one or more physical persistent memory devices and/or one or more non-persistent memory devices. Memory 115 can include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

Processor 103 can include a single central processing unit (CPU), which can be a single-core or multi-core processor (e.g., dual-core, quad-core, etc.), or can include multiple CPUs. Processor(s) 103 and its associated components can allow the roadside assistance device 101 to execute a series of computer-readable instructions, for example, receive signals or transmissions including location information, vehicle operation information, scan for diagnostic codes, and the like, to determine a location of the vehicle, determine a cause of an issue associated with the vehicle, control amount and type of data received, and the like.

The mobile device 151 (e.g., a personal mobile device, vehicle-based system, insurance system server, roadside assistance server, etc.) can operate in a networked environment 100 supporting connections to one or more remote computers, such as terminals 141, 151, and 161. Such terminals can be personal computers or servers 141 (e.g., home computers, laptops, web servers, database servers), mobile communication devices 151 (e.g., mobile phones, tablet computers, etc.), vehicle-based computing systems 161 (e.g., on-board vehicle systems, telematics devices, mobile phones or other personal mobile devices within vehicles), and the like, each of which can include some or all of the elements described above with respect to the roadside assistance device 101. The network connections depicted in FIG. 1 include a local area network (LAN) 125, a wide area network (WAN) 129, and a wireless telecommunications network 133, but can also include fewer or additional networks. When used in a LAN networking environment, the roadside assistance device 101 can be connected to the LAN 125 through a network interface or adapter 123. When used in a WAN networking environment, the roadside assistance device 101 can include a modem 127 or other means for establishing communications over the WAN 129, such as network 131 (e.g., the Internet). When used in a wireless telecommunications network 133, the roadside assistance device 101 can include one or more transceivers, digital signal processors, and additional circuitry and software for communicating with wireless computing devices 151 and 161 (e.g., mobile phones, portable customer computing devices, vehicle-based computing devices and systems, etc.) via one or more network devices 135 (e.g., base transceiver stations) in the wireless network 133. It should be noted that, in a variety of embodiments, the roadside assistance device 101 is implemented using mobile device 151. In many embodiments, the roadside assistance device 101 communicates with mobile device 151 to cooperatively implement and perform the systems and methods described herein.

Also illustrated in FIG. 1 is a security and integration layer 160, through which communications are sent and managed between the roadside assistance device 101 (e.g., a personal mobile device, a vehicle-based computing device, a roadside assistance server or computing platform, an intermediary server and/or external data source servers, etc.) and the remote devices (141, 151, and 161) and remote networks (125, 129, and 133). The security and integration layer 160 can include one or more separate computing devices, such as web servers, authentication servers, and/or various networking components (e.g., firewalls, routers, gateways, load balancers, etc.), having some or all of the elements described above with respect to the roadside assistance device 101. As an example, a security and integration layer 160 of a roadside assistance device 101 can include a set of web application servers configured to use secure protocols and to insulate the roadside assistance device 101 from external devices 141, 151, and 161. In some cases, the security and integration layer 160 can correspond to a set of dedicated hardware and/or software operating at the same physical location and under the control of same entities as roadside assistance device 101. For example, security and integration layer 160 can correspond to one or more dedicated web servers and network hardware in a vehicle and driver information datacenter or in a cloud infrastructure supporting cloud-based vehicle identification, location identification, vehicle operational parameters identification, issue detection, and the like. In other examples, the security and integration layer 160 can correspond to separate hardware and software components which can be operated at a separate physical location and/or by a separate entity.

As discussed herein, the data transferred to and from various devices in a roadside assistance system 100 can include secure and sensitive data, such as confidential vehicle operation data, insurance policy data, and confidential user data from drivers and passengers in vehicles. Therefore, it can be desirable to protect transmissions of such data using secure network protocols and encryption, and also to protect the integrity of the data when stored on the various devices within a system, such as mobile devices, vehicle-based devices, insurance servers, roadside assistance servers, external data source servers, or other computing devices in the roadside assistance system 100, using the security and integration layer 160 to authenticate users and restrict access to unknown or unauthorized users. In various implementations, security and integration layer 160 can provide, for example, a file-based integration scheme or a service-based integration scheme for transmitting data between the various devices in roadside assistance system 100. Data can be transmitted through the security and integration layer 160, using various network communication protocols. Secure data transmission protocols and/or encryption can be used in file transfers to protect the integrity of the data, for example, File Transfer Protocol (FTP), Secure File Transfer Protocol (SFTP), and/or Pretty Good Privacy (PGP) encryption. In other examples, one or more web services can be implemented within the various roadside assistance devices 101 in the roadside assistance system 100 and/or the security and integration layer 160. Web services can be accessed by authorized external devices and users to support input, extraction, and manipulation of the data (e.g., vehicle data, driver data, location data, breakdown issue data, etc.) between the various devices in the roadside assistance system 100. Web services built to support a personalized display system can be cross-domain and/or cross-platform, and can be built for enterprise use. Such web services can be developed in accordance with various web service standards, such as the Web Service Interoperability (WS-I) guidelines. In some examples, a driver data, vehicle data, location data, breakdown issue data and/or breakdown data analysis web service, or the like, can be implemented in the security and integration layer 160 using the Secure Sockets Layer (SSL) or Transport Layer Security (TLS) protocol to provide secure connections between roadside assistance devices 101 and various clients 141, 151, and 161. SSL or TLS can use HTTP or HTTPS to provide authentication and confidentiality. In other examples, such web services can be implemented using the WS-Security standard, which provides for secure SOAP messages using XML encryption. In still other examples, the security and integration layer 160 can include specialized hardware for providing secure web services. For example, secure network appliances in the security and integration layer 160 can include built-in features such as hardware-accelerated SSL and HTTPS, WS-Security, and firewalls. Such specialized hardware can be installed and configured in the security and integration layer 160 in front of the web servers, so that any external devices can communicate directly with the specialized hardware.

Although not shown in FIG. 1, various elements within memory 115 or other components in system 100, can include one or more caches, for example, CPU caches used by the processing unit 103, page caches used by the operating system 117, disk caches of a hard drive, and/or database caches used to cache content from database 121. For embodiments including a CPU cache, the CPU cache can be used by one or more processors in the processing unit 103 to reduce memory latency and access time. In such examples, a processor 103 can retrieve data from or write data to the CPU cache rather than reading/writing to memory 115, which can improve the speed of these operations. In some examples, a database cache can be created in which certain data from a database 121 (e.g., a database of driver data, database of vehicle information, database of location information, database of breakdown issue information, etc.) is cached in a separate smaller database on an application server separate from the database server (e.g., at a personal mobile device, vehicle-based data, or intermediary network device or cache device, etc.). For instance, in a multi-tiered application, a database cache on an application server can reduce data retrieval and data manipulation time by not needing to communicate over a network with a back-end database server. These types of caches and others can be included in various embodiments, and can provide potential advantages in certain implementations of roadside assistance systems, such as faster response times and less dependence on network conditions when transmitting and receiving driver information, vehicle information, location information, roadside assistance issue information, and the like.

It will be appreciated that the network connections shown are illustrative and other means of establishing a communications link between the computers can be used.

The existence of any of various network protocols such as TCP/IP, Ethernet, FTP, HTTP and the like, and of various wireless communication technologies such as GSM, CDMA, WiFi, and WiMAX, is presumed, and the various computing devices in roadside assistance system components described herein can be configured to communicate using any of these network protocols or technologies.

Additionally, one or more application programs 119 can be used by the various roadside assistance devices 101 within the roadside assistance system 100 (e.g., vehicle data, driver data, location data, roadside assistance issue data, and/or roadside assistance applications, etc.), including computer executable instructions for receiving and analyzing various signals or transmissions including location information, vehicle operating data, other vehicle operating data, and the like, determining a location of a vehicle, determining a cause of an issue, controlling an amount or type of data transmitted or received and the like.

Figure 2:
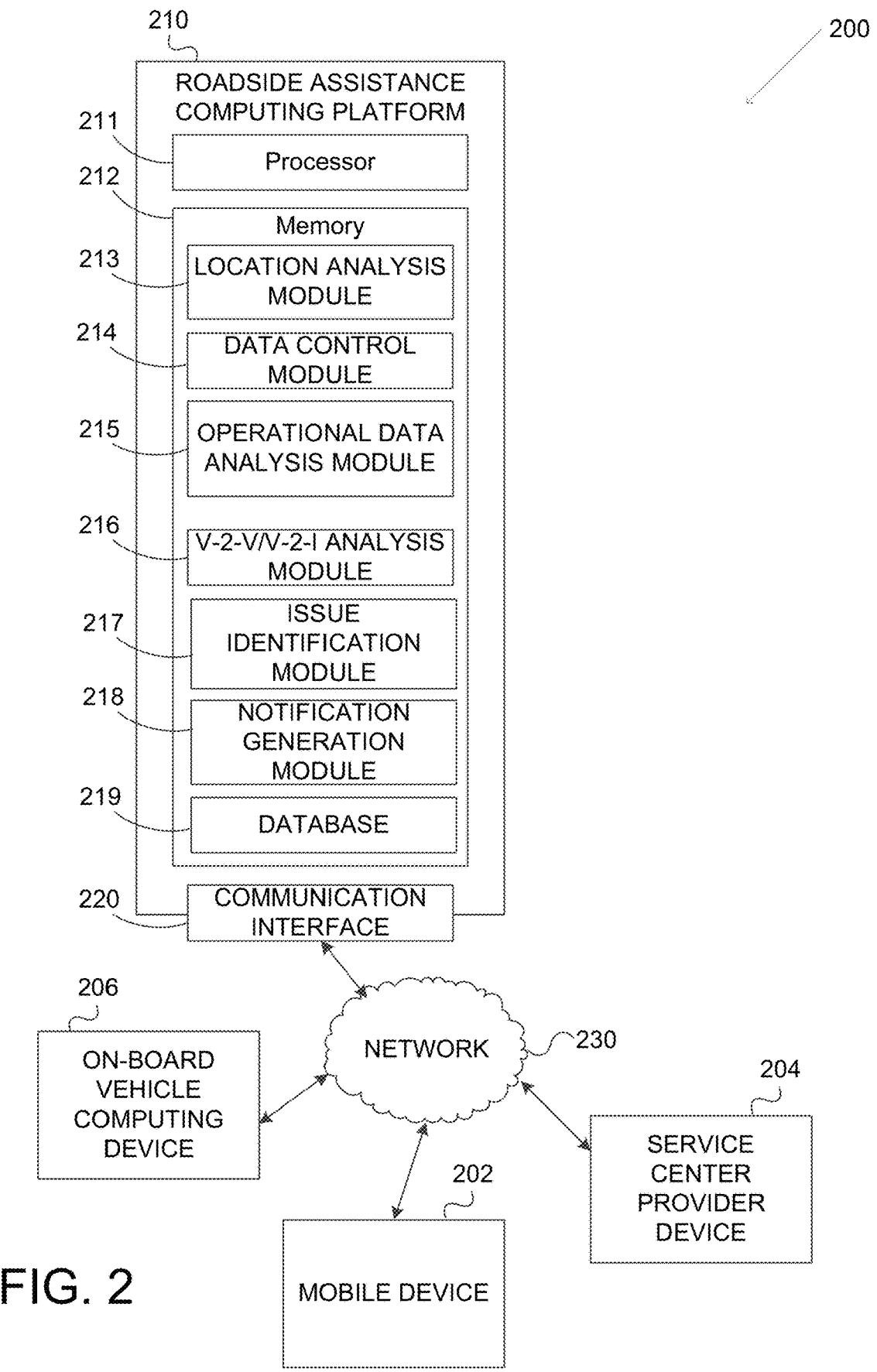
FIG. 2 illustrates one example roadside assistance system in accordance with one or more aspects described herein.

FIG. 2 depicts an environment 200 including an illustrative roadside assistance computing platform 210 for determining a location of a vehicle, determining that the vehicle is stopped, identifying an issue causing the vehicle to stop, and generating and transmitting one or more notifications based on the determined issue, according to one or more aspects described herein. For instance, the environment 200 includes a roadside assistance computing platform 210, which can include one or more processors 211, memory 212, and communication interface 220. A data bus can interconnect processor(s) 211, memory 212, and communication interface 220. Communication interface 220 can be a network interface configured to support communication between roadside assistance computing platform 210 and one or more networks (e.g., network 230). One or more computing destinations 202, 204, 206 can be in communication with the roadside assistance computing platform 210 (e.g., via network 230). Memory 212 can include one or more program modules having instructions that when executed by processor(s) 211 cause roadside assistance computing platform 210 to perform one or more functions described herein and/or one or more databases that can store and/or otherwise maintain information which can be used by such program modules and/or processor(s) 211. In some instances, the one or more program modules and/or databases can be stored by and/or maintained in different memory units of roadside assistance computing platform 210 and/or by different computer systems that can form and/or otherwise make up the roadside assistance computing platform 210. In some arrangements, different features or processes performed can be performed by different sets of instructions, such that the processor can execute each desired set of instructions to perform different functions described herein.

For example, memory 212 can include a location analysis module 213. The location analysis module 213 can receive data (e.g., signals or other electronic transmissions), for example, in real-time, including location information of a vehicle. In some examples, the location data can be received from a mobile device 202, which can include, for example, a smartphone, cell phone, tablet computing device, or the like, associated with the user and currently located with or within the vehicle. Global positioning system (GPS) data can be received from the mobile device 202 and processed to determine a current location of the vehicle, which can aid in determining whether the vehicle is currently located on a highway. In another example, GPS data can be received from one or more sensors located within the vehicle and transmitted via an on-board vehicle computing device 206. The data received can be processed to determine the current location of the vehicle.

Memory 212 can further include a data control module 214. Data control module 214 can be configured to control an amount or type of data collected by one or more sensors, transmitted to roadside assistance computing platform 210, or the like. For example, based on location analysis, vehicle operation data, and the like, the data control module 214 can increase or decrease (e.g., limit) an amount or type of data collected by one or more sensors (e.g., vehicle sensors, user computing device sensors, or the like). In some examples, the data control module 214 can determine an amount or type of data to be collected by the sensors or transmitted to the roadside assistance computing platform 210 and can transmit a command or instruction to a computing device associated with the sensors, such as on-board vehicle computing device 206, user computing device 202, or the like, controlling the amount or type of data collected. Accordingly, if a vehicle is determined to not be traveling on a highway, the data control module 214 can limit the amount of data transmitted to the roadside assistance computing platform 210 for processing to improve efficiency, conserve computing resources, and the like. Alternatively, if a vehicle is determined to be traveling on a highway, the data control module 214 can increase an amount or type of data collected by sensors and/or transmitted to the roadside assistance computing platform 210 to evaluate operational parameters of the vehicle, determine whether the vehicle is stopped, determine a cause or type of issue causing the vehicle to stop, and the like.

Memory 212 can further include an operational analysis data module 215. Operational analysis data module 215 can be configured to receive data (e.g., signals or other electronic transmissions), for example, in real-time, associated with operating parameters of the vehicle. For instance, data such as current speed, recent historical speeds, and the like, can be received by the operational analysis data module 215 and processed to evaluate operational parameters of the vehicle (e.g., to determine whether the vehicle is stopped). In some examples, data can be received from sensors in a user computing device 202. Data can be received from one or more vehicle based sensors and transmitted via an on-board vehicle computing device 206, telematics device, mobile device 202, or the like.

Memory 212 can further include vehicle-to-vehicle or vehicle-to-infrastructure data analysis module 216. The vehicle-to-vehicle or vehicle-to-infrastructure data analysis module 216 can be configured to receive data via short range vehicle-to-vehicle and/or vehicle-to-infrastructure communications to evaluate operating parameters of other vehicle at or near a location of the vehicle. For instance, the vehicle-to-vehicle or vehicle-to-infrastructure data analysis module 216 can receive data from one or more other vehicles, infrastructure, or the like, at or near a location of the vehicle being evaluated to determine whether the other vehicles are, for example, also stopped or are still moving and, if so, at what speed. This can aid in determining whether the vehicle being evaluated is stopped due to heavy traffic as opposed to being stopped because of an emergency, breakdown, or the like.

Memory 212 can further include issue identification module 217. Issue identification module 217 can be configured to receive data (e.g., signals or other electronic transmissions) to determine whether an issue with a vehicle has occurred and, if so, to determine whether the cause of the issue is an urgent situation reason or a non-urgent situation reason. For example, the issue identification module 217 can receive data indicating that a vehicle is stopped on a highway, that other traffic around the vehicle is still moving, and that the vehicle has not exited the highway. Accordingly, the issue identification module 217 can scan (e.g., in real-time) the diagnostic codes of the vehicle to determine whether one or more diagnostic codes have been activated. If so, the issue identification module 217 can determine that the vehicle is stopped for an urgent situation reason (e.g., low tire pressure, low fuel, low battery power, low oil level, or the like). If no diagnostic codes have been activated, in some examples, the issue identification module 217 can determine that the vehicle is stopped for a non-urgent situation reason (e.g., to place a phone call, to address an issue within the vehicle, or the like). In many embodiments, a mobile device includes one or more sensors capable of determining diagnostic codes for the vehicle (and/or any of the information described by the diagnostic codes) without a connection to the on-board vehicle diagnostic system. In this way, it should be understood that any vehicle data described herein can be captured and/or generated using a mobile device.

Memory 212 can further include a notification generation module 218. Notification generation module 218 can be configured to generate, transmit and/or cause to display one or more different types of notifications based on whether the vehicle is stopped for an urgent situation reason or a non-urgent situation reason. For instance, if the vehicle is stopped for an urgent situation reason (e.g., as determined by the issue identification module 217), a request for assistance can be transmitted to a service center computing device 204 and a notification can be generated and transmitted to the user computing device 202, on-board vehicle computing device 206, or the like, indicating that an issue has been detected and that a request for assistance has been sent. In some examples, the notification can include an estimated time of arrival of assistance. Accordingly, in at least some examples, if it is determined that the vehicle is stopped for an urgent situation reason, the roadside assistance computing platform 210 can automatically request roadside assistance for the vehicle (e.g., without additional user input). If it is determined (e.g., by the issue determination module 217) that the vehicle is stopped for a non-urgent situation reason, a second type of notification can be generated and transmitted to a device. The second type of notification can be different from the first type of notification. For instance, the second type of notification can indicate that the system has recognized that the vehicle is stopped, can request user input confirming that there is no emergency or urgent situation, can provide information about a surrounding area, and the like. The generated notifications can be transmitted to one or more computing devices, e.g., devices 202, 204, 206, via push notifications, short message service (SMS), via an application executing one or more devices 202, 204, 206, or the like. The roadside assistance computing platform 210 can cause the notifications to display on a display of the one or more computing devices 202, 204, 206.

Roadside assistance computing platform 210 can further include a database 219. The database 219 can include or store information associated with the driver of the vehicle, the vehicle itself, insurance policy information, historical issues detected, and the like. This information can be used to aid in determining when an issue has occurred, what type of issue, and the like. For instance, historical data can indicate that that the vehicle has previously stopped in a same or similar location. Accordingly, this can indicate that the vehicle is stopped for a non-urgent situation reason.

Although the various modules of the roadside assistance computing platform 210 are described separately, functionality of the various modules can be combined and/or can be performed by a single device or multiple computing devices in communication without departing from the invention. In particular, it should be noted that the roadside assistance computing platform can be implemented in whole or in part by mobile device 202.

Figure 3:
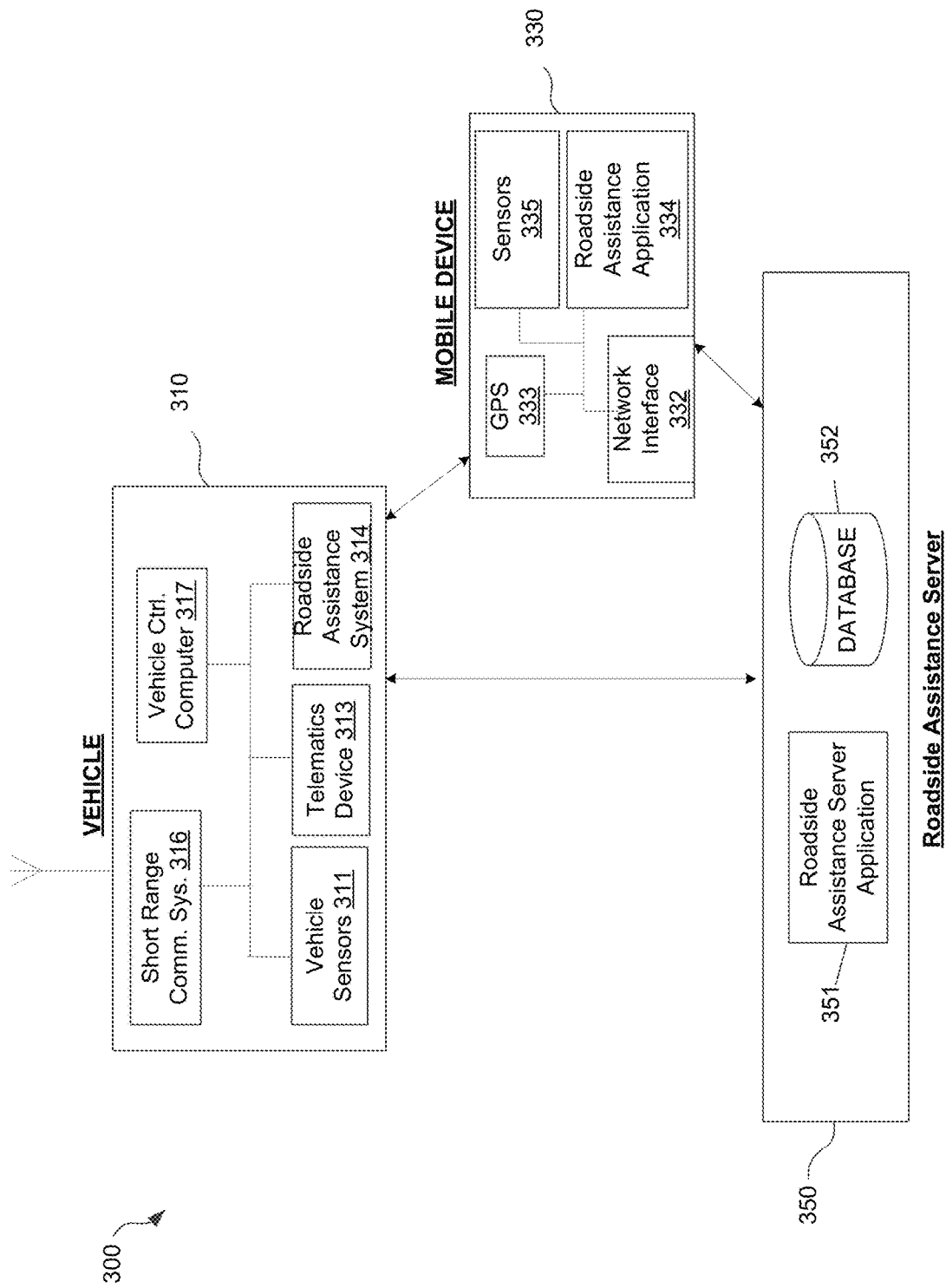
FIG. 3 is another example roadside assistance system in accordance with one or more aspects described herein.

FIG. 3 is a diagram of an illustrative roadside assistance system 300. The roadside assistance system 300 includes a vehicle 310 (e.g., the vehicle being evaluated for potential breakdown), a mobile device 330, a roadside assistance server 350, and additional related components. As discussed herein, the components of the system 300, individually or using communication and collaborative interaction, can determine a location of vehicle 310, determine whether the vehicle has stopped, control an amount or type of data received and/or processed, determine whether the vehicle is stopped for an urgent situation reason or a non-urgent situation reason, and generate and transmit one or more notifications. To perform such functions, the components shown in FIG. 3 each can be implemented in hardware, software, or a combination of the two. Additionally, each component of the roadside assistance system 300 can include a computing device (or system) having some or all of the structural components described herein for mobile device 330.

Vehicle 310 in the roadside assistance system 300 can be, for example, an automobile, a motorcycle, a scooter, a bus, a recreational vehicle, a boat, or other vehicle for which vehicle data, location data, driver data (or operator data), operational data and/or other driving data (e.g., location data, time data, weather data, etc.) can be collected and/or analyzed. The vehicle 310 includes vehicle operation sensor 311 capable of detecting and recording various conditions at the vehicle and operational parameters of the vehicle. For example, sensor 311 can detect and store data corresponding to the vehicle's location (e.g., GPS coordinates), time, travel time, speed and direction, rates of acceleration or braking, gas mileage, and specific instances of sudden acceleration, braking, swerving, and distance traveled. Sensor 311 also can detect and store data received from the vehicle's 310 internal systems, such as impact to the body of the vehicle, air bag deployment, tire status, headlights usage, brake light operation, door opening and closing, door locking and unlocking, cruise control usage, hazard lights usage, windshield wiper usage, horn usage, turn signal usage, seat belt usage, phone and radio usage within the vehicle, autonomous driving system usage, maintenance performed on the vehicle, and other data collected by the vehicle's computer systems, including the vehicle on-board diagnostic systems (OBD).

Additional sensors 311 can detect and store the external driving conditions, for example, external temperature, rain, snow, light levels, and sun position for driver visibility. For example, external cameras and proximity sensors 311 can detect other nearby vehicles, vehicle spacing, traffic levels, road conditions, traffic obstructions, animals, cyclists, pedestrians, and other conditions that can factor into a roadside assistance analysis. Sensor 311 also can detect and store data relating to moving violations and the observance of traffic signals and signs by the vehicle 310. Additional sensors 311 can detect and store data relating to the maintenance of the vehicle 310, such as the engine status, oil level, engine coolant temperature, odometer reading, the level of fuel in the fuel tank, engine revolutions per minute, software upgrades, and/or tire pressure.

Vehicles sensor 311 also can include cameras and/or proximity sensors capable of recording additional conditions inside or outside of the vehicle 310. For example, internal cameras can detect conditions such as the number of the passengers and the types of passengers (e.g. adults, children, teenagers, pets, etc.) in the vehicles, and potential sources of driver distraction within the vehicle (e.g., pets, phone usage, and unsecured objects in the vehicle). Sensor 311 also can be configured to collect data identifying a current driver from among a number of different possible drivers, for example, based on driver's seat and mirror positioning, driving times and routes, radio usage, etc. Voice/sound data along with directional data also can be used to determine a seating position within a vehicle 310. Sensor 311 also can be configured to collect data relating to a driver's movements or the condition of a driver. For example, vehicle 310 can include sensors that monitor a driver's movements, such as the driver's eye position and/or head position, etc. Additional sensors 311 can collect data regarding the physical or mental state of the driver, such as fatigue or intoxication. The condition of the driver can be determined through the movements of the driver or through other sensors, for example, sensors that detect the content of alcohol in the air or blood alcohol content of the driver, such as a breathalyzer, along with other biometric sensors.

Certain vehicle sensors 311 also can collect information regarding the driver's route choice, whether the driver follows a given route, and to classify the type of trip (e.g. commute, errand, new route, etc.) and type of driving (e.g., continuous driving, parking, stop-and-go traffic, etc.). In certain embodiments, sensors and/or cameras 311 can determine when and how often the vehicle 310 stays in a single lane or strays into other lane. A Global Positioning System (GPS), locational sensors positioned inside the vehicle 310, and/or locational sensors or devices external to the vehicle 310 can be used to determine the route, speed, lane position, road-type (e.g. highway, entrance/exit ramp, residential area, etc.) and other vehicle position/location data.

The data collected by vehicle sensor 311 can be stored and/or analyzed within the vehicle 310, such as for example by a roadside assistance system 314 integrated into the vehicle, and/or can be transmitted to one or more external devices. For example, as shown in FIG. 3, sensor data can be transmitted via a telematics device 313 to one or more remote computing devices, such as personal mobile device 330, roadside assistance server 350, and/or other remote devices.

As shown in FIG. 3, the data collected by vehicle sensor 311 can be transmitted to roadside assistance server 350, mobile device 330, and/or additional external servers and devices via telematics device 313. As discussed herein, the telematics device 313 can receive vehicle operation data and driving data from vehicle sensor 311, and can transmit the data to one or more external computer systems (e.g., roadside assistance server 350 of an insurance provider, financial institution, or other entity) over a wireless transmission network. Telematics device 313 also can be configured to detect or determine additional types of data relating to real-time driving and the condition of the vehicle 310. The telematics device 313 also can store the type of vehicle 310, for example, the make, model, trim (or sub-model), year, and/or engine specifications, as well as other information such as vehicle owner or driver information, insurance information, and financing information for the vehicle 310. In the example shown in FIG. 3, telematics device 313 can receive vehicle driving data from vehicle sensor 311, and can transmit the data to a roadside assistance server 350. However, in other examples, one or more of the vehicle sensors 311 or systems can be configured to receive and transmit data directly from or to a roadside assistance server 350 without using a telematics device. For instance, telematics device 313 can be configured to receive and transmit data from certain vehicle sensors 311 or systems, while other sensors or systems can be configured to directly receive and/or transmit data to a roadside assistance server 350 without using the telematics device 313. Thus, telematics device 313 can be optional in certain embodiments. In a variety of embodiments, a mobile device is capable of capturing and/or generating any of the data obtained by a telematics device without a connection to the telematics device.

In some examples, telematics, sensor data, and/or other data (e.g., error or issue codes associated with maintenance of a vehicle) can be transmitted (e.g., to roadside assistance server) and can be used to further aid in identifying an issue or type of issue a vehicle can be having.

Vehicle 310 can further include a short-range communication system 316. The short-range communication systems 316 can be vehicle-based data transmission systems configured to transmit vehicle operational data to other nearby vehicles, and to receive vehicle operational data from other nearby vehicles. In some examples, communication system 316 can use the dedicated short-range communications (DSRC) protocols and standards to perform wireless communications between vehicles. In the United States, 75 MHz in the 5.850-5.925 GHz band have been allocated for DSRC systems and applications, and various other DSRC allocations have been defined in other countries and jurisdictions. However, short-range communication system 316 need not use DSRC, and can be implemented using other short-range wireless protocols in other examples, such as WLAN communication protocols (e.g., IEEE 802.11), Bluetooth (e.g., IEEE 802.15.1), or one or more of the Communication Access for Land Mobiles (CALM) wireless communication protocols and air interfaces. The vehicle-to-vehicle (V2V) transmissions between the short-range communication system 316 can be sent via DSRC, Bluetooth, satellite, GSM infrared, IEEE 802.11, WiMAX, RFID, and/or any suitable wireless communication media, standards, and protocols. In certain systems, short-range communication system 316 can include specialized hardware installed in vehicles 310 (e.g., transceivers, antennas, etc.), while in other examples the communication system 316 can be implemented using existing vehicle hardware components (e.g., radio and satellite equipment, navigation computers) or can be implemented by software running on the mobile device 330 of drivers and passengers within the vehicle 310. The range of V2V communications can depend on the wireless communication standards and protocols used, the transmission/reception hardware (e.g., transceivers, power sources, antennas), and other factors. Short-range V2V communications can range from just a few feet to many miles, and different types of driving behaviors, vehicle operational parameters, and the like, can be determined depending on the range of the V2V communications.

V2V communications also can include vehicle-to-infrastructure (V2I) communications, such as transmissions to or from vehicles to or from non-vehicle receiving devices, such as infrastructure. Infrastructure can include one or more of toll booths, rail road crossings, parking garages, road segments, parking lots, buildings or other structures, and/or road-side traffic monitoring devices which can include one or more sensors for detecting environmental conditions (e.g., weather, lighting, etc.) as well as parking availability. Certain V2V communication systems can periodically broadcast data from a vehicle 310 to any other vehicle or other infrastructure device capable of receiving the communication within the range of the vehicle's transmission capabilities. For example, a vehicle 310 can periodically broadcast (e.g., every 0.1 second, every 0.5 seconds, every second, every 5 seconds, dynamically, etc.) certain vehicle operation data via its short-range communication system 316, regardless of whether or not any other vehicles or reception devices are in range. In other examples, a vehicle communication system 316 can first detect nearby vehicles and receiving devices, and can initialize communication with each by performing a handshaking transaction before beginning to transmit its vehicle operation data to the other vehicles and/or devices. Broadcasts from infrastructure can also have varying ranges and, in some examples, infrastructure can broadcast to an intermediate station which can then relay the information to the roadside assistance server 350 (or other device).

The types of vehicle operational data, vehicle driving data, breakdown issue data, or the like, transmitted to or from vehicle 310 and/or infrastructure can depend on the protocols and standards used for the V2V or V2I communication, the range of communications, and other factors. In certain examples, vehicle 310 can periodically broadcast corresponding sets of similar vehicle driving data, such as the location (which can include an absolute location in GPS coordinates or other coordinate systems, and/or a relative location with respect to another vehicle or a fixed point), speed, and direction of travel. In certain examples, the nodes in a V2V (or V2I) communication system (e.g., vehicles and other reception devices) can use internal clocks with synchronized time signals and can send transmission times within V2V (or V2I) communications so that the receiver can calculate its distance from the transmitting node based on the difference between the transmission time and the reception time. The state or usage of the vehicle's controls and instruments can also be transmitted, for example, whether the vehicle is accelerating, braking, turning, and by how much, and/or which of the vehicle's instruments are currently activated by the driver (e.g., head lights, turn signals, hazard lights, cruise control, 4-wheel drive, traction control, etc.). Vehicle warnings such as a detection by the vehicle's internal systems that the vehicle is skidding, that an impact has occurred, or that the vehicle's airbags have been deployed, that a vehicle has stopped unexpectedly, also can be transmitted in V2V (or V2I) communications.

In various other examples, any data collected by any vehicle sensors 311 potentially can be transmitted via V2V or V2I communication to other nearby vehicles or infrastructure devices receiving V2V or V2I communications from communication system 316. Further, additional vehicle driving data not from the vehicle's sensors (e.g., vehicle make/model/year information, driver insurance information, driving route information, vehicle maintenance information, driver scores, etc.) can be collected from other data sources, such as mobile device 330, and transmitted using V2V or V2I communications to nearby vehicles and other receiving devices using communication system 316.

The system 300 in FIG. 3 also includes a mobile device 330. Mobile device 330 can be, for example, a smartphone or other mobile phone, personal digital assistant (PDAs), tablet computer, and the like, and can include some or all of the elements described herein. Specifically, it should be noted that some or all of the functionality described with respect to vehicle 310 and/or roadside assistance server 350 can be implemented using mobile device 330. Some mobile devices in systems 300 (e.g., mobile device 330) can be configured to establish communication sessions with vehicle-based devices and various internal components of vehicle 310 via wireless networks or wired connections (e.g., for docked devices), whereby such mobile devices 330 can have secure access to internal vehicle sensors 311 and other vehicle-based systems. However, in other examples, the mobile device 330 might not connect to vehicle-based computing devices and internal components, but can operate independently by communicating with vehicle 310 via their standard communication interfaces (e.g., telematics device 313, etc.), or might not connect at all to vehicle 310.

Mobile device 330 can include a network interface 332, which can include various network interface hardware (e.g., adapters, modems, wireless transceivers, etc.) and software components to enable mobile device 330 to communicate with roadside assistance server 350, vehicle 310, and various other external computing devices. One or more specialized software applications, such as a roadside assistance application 334, can be stored in the memory of the mobile device 330. The roadside assistance application 334 can be received (e.g., downloaded or otherwise provided) via network interface 332 from the roadside assistance server 350, vehicle 310, or other application providers (e.g., application stores). As discussed below, the roadside assistance application 334 can include various user interface screens, and can be configured to run as user-initiated applications or as background applications. The memory of the mobile device 330 also can include databases configured to receive and store vehicle data, driving data, driving trip data, and the like, associated with one or more drivers, vehicles, and the like.

Mobile device 330 can include various components configured to generate and/or receive vehicle data, driver data, and driving data or other operational data, as well as communicate with other devices within the system 300. As discussed herein, the roadside assistance software application 334 can store and analyze the data from various mobile device components, historical data, and the like, and can use this data, in conjunction with one or more other devices (e.g., roadside assistance server 350), to identify a location of a vehicle, determine operational parameters of a vehicle, identify a potential issue or type of issue, generate, transmit or receive notifications, and the like. Mobile computing device 330 can store, analyze, and/or transmit the data to one or more other devices. For example, mobile computing device 330 can transmit data directly to one or more roadside assistance servers 350. As discussed above, the roadside assistance server 350 can determine a location of the vehicle being evaluated, control data collected or received and processed by the system, determine operational parameters of the vehicle, identify one or more issues or types of issues, and generate and transmit notifications. In some examples, one or more of these functions can be performed by the processing components of the mobile device (e.g., via roadside assistance application 334). Therefore, in certain arrangements, mobile computing device 330 can be used in conjunction with, or in place of, the roadside assistance server 350.

Vehicle 310 can include roadside assistance system 314, which can be a separate computing device or can be integrated into one or more other components within the vehicle 310, such as the telematics device 313, autonomous driving systems, or the internal computing systems of vehicle 310. As discussed above, roadside assistance analysis computer 314 also can be implemented by computing devices independent from the vehicle 310, such as mobile device 330 of the drivers or passengers, or one or more separate computer systems (e.g., a user's home or office computer). In any of these examples, the roadside assistance system 314 can contain some or all of the hardware/software components of various devices and systems described herein. Further, in certain implementations, the functionality of the roadside assistance system, such as storing and analyzing driver data, vehicle data, location data, and the like, can be performed in a roadside assistance server 350 rather than by the individual vehicle 310 or mobile device 330. In such implementations, the vehicle 310 and and/or mobile device 330, might only collect and transmit driver data, sensor data, location data, vehicle operational data, and the like to roadside assistance server 350, and thus the vehicle-based roadside assistance system 314 can be optional.

The system 300 also can include one or more roadside assistance servers 350, containing some or all of the hardware/software components described herein. The roadside assistance server 350 can include hardware, software, and network components to receive data (e.g., signals or other electronic transmissions) related to location, operational data, and the like, process the data, control an amount or type of data collected by sensors and/or transmitted for processing or analysis, identify an issue or type of issue associated with a vehicle, generate and transmit notifications, and the like, from one or more of vehicle 310, mobile device 330, and other data sources. The roadside assistance server 350 can include a roadside assistance database 352 and roadside assistance server application 351 to respectively store and analyze driver data, vehicle data, sensor data, etc., received from vehicle 310, mobile device 330, and/or other data sources. In some examples, the roadside assistance server 351 can include many or all of the components of the roadside assistance computing platform 210 described with respect to FIG. 2.

In some examples, some data can be received by the roadside assistance server 350 from vehicle 310 wirelessly via telematics device 313. Additionally, the roadside assistance server 350 can receive additional data from other third-party data sources, such as external traffic databases containing traffic data (e.g., amounts of traffic, average driving speed, traffic speed distribution, and numbers and types of accidents, etc.) at various times and locations, external weather databases containing weather data (e.g., rain, snow, sleet, and hail amounts, temperatures, wind, road conditions, visibility, etc.) at various times and locations, and other external data sources containing driving hazard data (e.g., road hazards, traffic accidents, downed trees, power outages, road construction zones, school zones, and natural disasters, etc.), route and navigation information, and insurance company databases containing insurance data (e.g., coverage amount, deductible amount, premium amount, insured status) for the vehicle, driver, and/or other nearby vehicles and drivers, and the like.

Data stored in the roadside assistance database 352 can be organized in any of several different manners. For example, a roadside assistance table can contain data related to previous roadside assistance issues, vehicle features (e.g., organized by make, model, year, etc.), special equipment needs for particular vehicles, images of roadside assistance issues, etc. Other tables in the database 352 can store additional data, including data types discussed above (e.g. traffic information, road-type and road condition information, weather data, insurance policy data, etc.). Additionally, one or more other databases of other insurance providers containing additional driver data and vehicle data can be accessed to retrieve such additional data. In a variety of embodiments, this data can include a risk map including data associated with one or more of vehicle accident data, traffic data, vehicle volume data, vehicle density data, road characteristic data, or weather data for a variety of geographical locations. Systems and methods for generating and utilizing risk maps that can be utilized in accordance with embodiments of the invention are disclosed in U.S. Pat. No. 9,581,461, titled "Data Processing System Communicating with a Map Data Processing System to Generate a Display of One or More Segments of One or More Vehicle Routes" and issued Feb. 28, 2017, the disclosure of which is hereby incorporated by reference in its entirety.

The roadside assistance server application 351 within the roadside assistance server 350 can direct the roadside assistance server 350 to retrieve data from the database 352, or can receive data directly from mobile device 330, or other data sources, and can perform one or more analyses to evaluate the data received, determine a location of the vehicle, determine whether the vehicle has stopped, control an amount or type of data collected or transmitted for processing, identify an issue or type of issue, generate and transmit notifications, and other related functions. The functions performed by the roadside assistance server application 350 can be performed by specialized hardware and/or software separate from the additional functionality of the roadside assistance server 350. Such functions and further descriptions and examples of the algorithms, functions, and analyses that can be executed by the roadside assistance server 350 are described herein.

In various examples, the roadside assistance analyses, identifications and determinations can be performed entirely in the roadside assistance server 350, can be performed entirely in the vehicle-based roadside assistance analysis computing module 314, or can be performed entirely by the mobile device 330. In other examples, certain analyses of data, and the like, can be performed by vehicle-based devices (e.g., within roadside assistance analysis device 314) or mobile device 330 (e.g., within application 334), while other data analyses are performed by the roadside assistance server 350. Various other combinations of devices processing data can be used without departing from the invention.

Roadside Assistance Processes

Figure 4B:
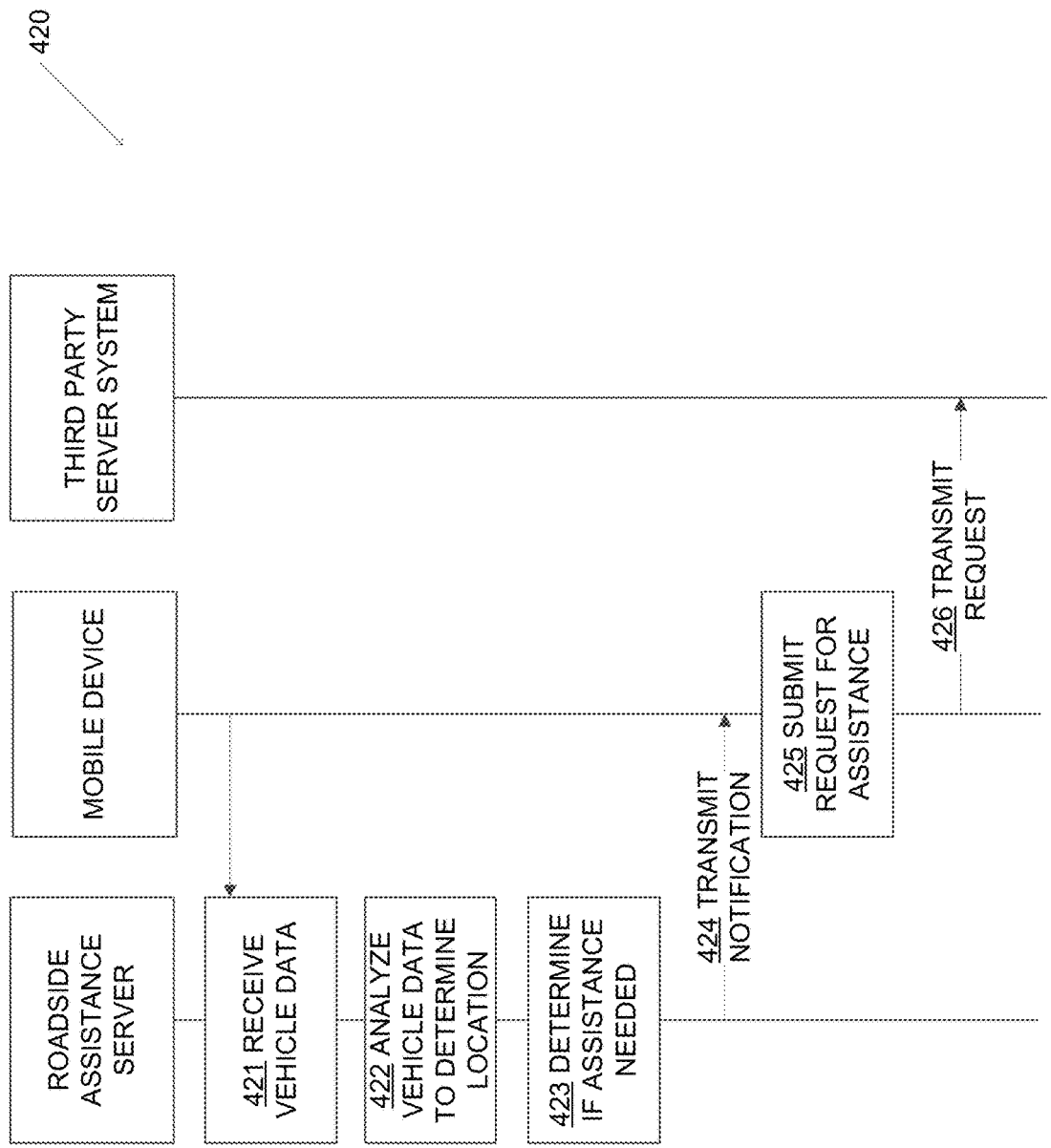

FIGS. 4A-C illustrate example events sequence for determining a location of a vehicle, determining whether the vehicle is experiencing a roadside event, and generating and transmitting notifications according to one or more aspects described herein. The sequence illustrated in FIGS. 4A-C are merely example sequences and various other events can be included, or events shown can be omitted, without departing from the invention. Further, one or more processes shown and/or described with respect to FIGS. 4A-C can be performed in real-time or near real-time.

With reference to event sequence 400 shown in FIG. 4A, in step 401, vehicle data can be received by a roadside assistance server from one or more sensors in a mobile device located within (or near) a vehicle. The vehicle data received can include signals or other electronic transmissions including location data, such as GPS data, and data regarding the operational state of the vehicle.

In step 402, the roadside assistance server can analyze the received vehicle data to determine a location of the vehicle (e.g., based on the GPS data) and/or the operational state of the vehicle. For example, the roadside assistance server can determine whether the vehicle is stopped for an urgent situation reason (e.g., flat tire, out of gas, mechanical issue, etc.) or a non-urgent situation reason (e.g., missed exit, looking for information about area, or the like). In some examples, the roadside assistance server can determine whether one or more diagnostic codes have been activated. If no diagnostic codes are activated, the roadside assistance server can determine that the vehicle is stopped for a non-urgent situation reason. Data received regarding other vehicles can be utilized to determine whether those vehicles are also stopped (e.g., due to traffic, accident in the area, etc.). If other vehicles are also stopped, the vehicle can be stopped for a non-urgent situation reason. If the other vehicles are still moving (e.g., are moving a predetermined threshold amount faster than the vehicle being evaluated) the roadside assistance server can determine that the vehicle is stopped for an urgent situation reason.

In step 403, the roadside assistance server can determine whether roadside assistance can be required for the vehicle. For example, the roadside assistance server can determine whether the determined location is within a threshold distance (e.g., 10 feet, 100 feet, or the like) of a highway and/or the vehicle is parked along a busy street and/or has its hazard lights engaged based on processing audio data captured by the mobile device. In some examples, this determination can be made by comparing the received GPS data with known map data. In a variety of embodiments, the known map data can include a risk map describing the conditions of the geographic area. In a variety of embodiments, the geographic area is determined by utilizing machine learning techniques to process map and/or satellite images to determine a probability vector describing the geographic location. The geographic location can include a variety of usual parking locations (parking lots, residential streets, etc.) and unusual parking locations (highways, remote roads, etc.) and the probability vector can describe the likelihood that a particular location is a usual or unusual parking location. In many embodiments, the determination if roadside assistance is needed is based on determining if the vehicle has a flat tire. A variety of sensor data captured using any of a variety of sensors, such as gyroscopes, accelerometers, and magnetometers, can be utilized to measure the vibration of a vehicle to determine if the vehicle has a flat tire and/or a tire with low air pressure. In several embodiments, machine learning techniques can be utilized to calculate one or more probability vectors describing the likelihood that the vehicle has one or more low or flat tires. Additionally, the sensor data can be utilized to calculate the vehicle's pull over pattern. In several embodiments, machine learning techniques can be utilized to calculate one or more probability vectors describing the likelihood that the vehicle pulled over to the side of a road in a manner corresponding to an emergency stop.

In steps 404 and 405, one or more notifications can be provided to the mobile device and/or third-party server systems. Notifications provided to the mobile device can elicit additional information from the occupants of the vehicle, while notifications provided to third-party server systems can be utilized to provide updates regarding the operational status of the vehicle and/or request roadside assistance be provided as described in more detail herein. The type of notification generated can be based on whether the vehicle is determined to be stopped for an urgent situation reason or a non-urgent situation reason. In some examples, a first type of notification can be generated and transmitted to the mobile device in step 404 if the vehicle is stopped for an urgent situation reason. Further, if the vehicle is stopped for an urgent reason, a notification and request for assistance can be transmitted to a third party server system in step 405. The request can include a location of the vehicle, a description of the issue, and the like. Additionally, the roadside assistance server can generate a notification that is transmitted to the mobile device. The notification can include an indication that an issue has been detected and that assistance has been requested. The notification can further include an estimated time of arrival of assistance, as well as an option for the user to provide feedback or input (e.g., decline the requested assistance, request additional assistance, or the like). If the vehicle is stopped for a non-urgent situation reason, a second type of notification can be transmitted to the mobile device in step 404. The second type of notification can be different from the first type. For example, the second type of notification can include an indication that the system has recognized the vehicle is stopped and can request user input if additional assistance is required. The second type of notification can include information about an area surrounding the location of the vehicle (e.g., local points of interest, food or lodging nearby, or the like). The second type of notification can be transmitted to the mobile device via push notification, SMS, or the like.

Turning now to event sequence 420 shown in FIG. 4B, in step 421, vehicle data can be received by a roadside assistance server from one or more sensors in a mobile device located within (or near) a vehicle. The vehicle data received can include signals or other electronic transmissions including location data, such as GPS data, and data regarding the operational state of the vehicle. In step 422, the roadside assistance server can analyze the received vehicle data to determine a location of the vehicle (e.g., based on the GPS data) and/or the operational state of the vehicle. In step 423, the roadside assistance server can determine whether roadside assistance can be required for the vehicle. For example, the roadside assistance server can determine whether the determined location is within a threshold distance of a highway and/or the vehicle is parked along a busy street and/or has its hazard lights engaged based on processing audio data captured by the mobile device. In some examples, this determination can be made by comparing the received GPS data with known map data. In a variety of embodiments, the known map data can include a risk map describing the conditions of the geographic area.

In step 424, one or more notifications can be provided to the mobile device. Notifications provided to the mobile device can elicit additional information from the occupants of the vehicle regarding the need for roadside assistance. If a request for roadside assistance is provided at step 425, the mobile device can transmit a request to a third-party server system in step 426. The request to the third-party server system can include a request for an emergency vehicle and/or roadside support, a request to place a call to one or more contacts obtained using the mobile device, and/or any other request as appropriate to the requirements of specific application of embodiments of the invention.

Turning now to event sequence 440 shown in FIG. 4C, in step 441, vehicle data can be received by a roadside assistance server from one or more sensors in a mobile device located within (or near) a vehicle. The vehicle data received can include signals or other electronic transmissions including location data, such as GPS data, and data regarding the operational state of the vehicle. In step 442, the roadside assistance server can analyze the received vehicle data to determine a location of the vehicle (e.g., based on the GPS data) and/or the operational state of the vehicle. In step 443, the roadside assistance server can determine whether roadside assistance can be required for the vehicle. For example, the roadside assistance server can determine whether the determined location is within a threshold distance of a highway and/or the vehicle is parked along a busy street and/or has its hazard lights engaged based on processing audio data captured by the mobile device. In some examples, this determination can be made by comparing the received GPS data with known map data. In a variety of embodiments, the known map data can include a risk map describing the conditions of the geographic area.

In step 444, one or more notifications can be provided to the mobile device. Notifications provided to the mobile device can elicit additional information from the occupants of the vehicle regarding the need for roadside assistance. If a request for roadside assistance is provided at step 445, the mobile device can transmit a request for assistance to the roadside assistance server in step 446. The roadside assistance server can determine one or more third-party server systems to transmit a request for assistance in step 447. The requests to the third-party server system can include a request for an emergency vehicle and/or roadside support, a request to place a call to one or more contacts obtained using the mobile device, and/or any other request as appropriate to the requirements of specific application of embodiments of the invention.

Although the event sequences described with respect to FIGS. 4A-C include a separate roadside assistance server and mobile device, it should be noted that all steps can be performed by either system alone or in combination. In this way, the event sequences described with respect to FIGS. 4A-C can be performed using only a mobile device, cloud-based services, and/or any combination of computing devices as appropriate to the requirements of specific applications of embodiments of the invention.

Determining if a vehicle is experiencing a roadside event can include obtaining and processing a variety of data regarding a vehicle. In a variety of embodiments, this data is captured using one or more mobile devices located within the vehicle. A variety of data can be captured regarding the operational state, location, and/or surrounding environment of the vehicle (e.g. vehicle status). The operational state of the vehicle can include determining if the vehicle is moving, how fast the vehicle is moving, the acceleration/deceleration of the vehicle, and/or if the vehicle is stopped. In several embodiments, the operational state of the vehicle is determined using one or more sensors, such as but not limited to accelerometers, GPS receivers, and/or gyroscopes, located within a mobile device. The location of the vehicle can be determined using any of a variety of techniques, including using a GPS receiver to determine the geographic location of the vehicle. In a number of embodiments, the location of the vehicle is based on a risk map identifying characteristics of a particular geographic location. Data describing the state of the environment the vehicle is located in can be captured using a variety of sensors, such as but not limited to microphones and camera. In many embodiments, audio data is captured using a microphone and processed to determine one or more characteristics present within the audio data. These characteristics can include, but are not limited to, determining if the vehicle is located in an environment with traffic noise (thereby indicating that the vehicle can be stopped alongside a roadway with moving traffic) and determining if the hazard lights in the vehicle have been activated (thereby indicating that the driver has determined that an emergency stop was needed). In several embodiments, machine learning techniques are utilized to process the audio data to calculate one or more feature vectors within the audio data, where a feature vector identifies one or more characteristic audio signals within the audio data. These feature vectors can be binary and/or expressed as a probabilistic likelihood of being present to allow for the classification of roadside events based on the audio data. Similarly, image and/or video data can be captured using a camera located in a mobile device and processed using a variety of image processing techniques. The characteristics identified in the audio data can be processed along with the vehicle location and/or operational status to determine if a roadside event is occurring, the severity of the roadside event, and/or if roadside assistance can be needed. In some examples, the determination of the operational status can be based on a scan of diagnostic codes activated in the vehicle.

Depending on the specifics of the roadside event, one or more notifications can be generated and provided to the mobile device. These notifications can solicit additional information from the user of the vehicle, provide information to the user, and/or request roadside assistance from one or more third-party systems. In a variety of embodiments, phone calls and/or SMS messages can be provided to one or more contacts—the contacts can be pre-determined and/or selected from a contact list stored on the mobile device. The requests for roadside assistance can be made based on information provided by the user, the location of the vehicle, and/or the determined type of roadside event. For example, if it is determined that the vehicle has a flat tire, a roadside assistance service can be notified, while if it is determined that the vehicle is on fire, emergency services can be notified. The request for roadside assistance can include data regarding the roadside event, the location of the vehicle, and/or any other data as appropriate to the requirements of specific applications of embodiments of the invention.

Figure 5:
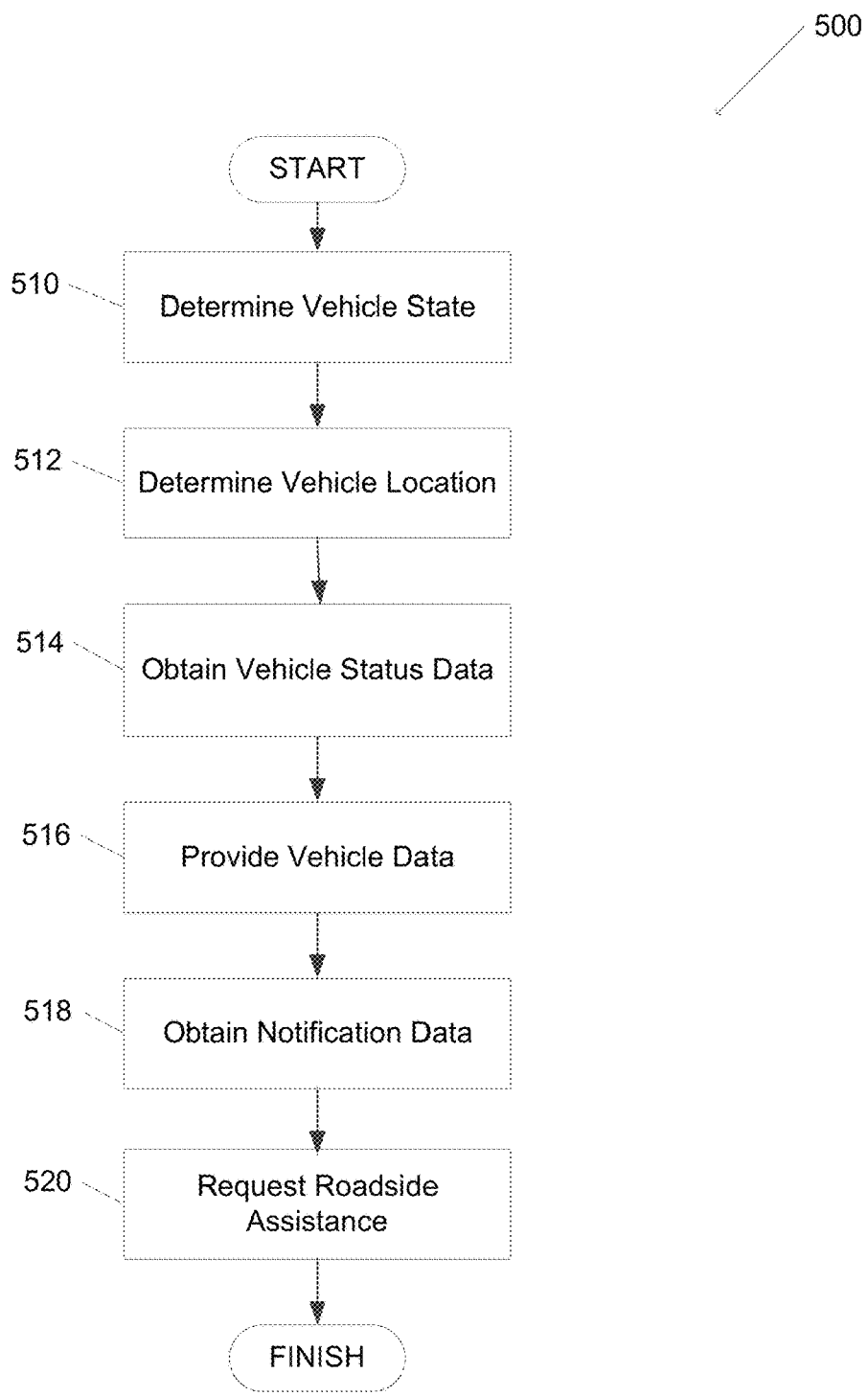
FIG. 5 illustrates a process for determining if a vehicle is experiencing a roadside event in accordance with an embodiment of the invention.

Turning now to FIG. 5, a process for requesting roadside assistance in accordance with an embodiment of the invention is shown. Some or all of the steps of process 500 can be performed using any of the computing devices described herein. The process 500 includes determining (510) a vehicle state, determining (512) a vehicle location, obtaining (514) vehicle status data, providing (516) vehicle data, obtaining (518) notification data, and, in many embodiments, requesting (520) roadside assistance.

Figure 6:
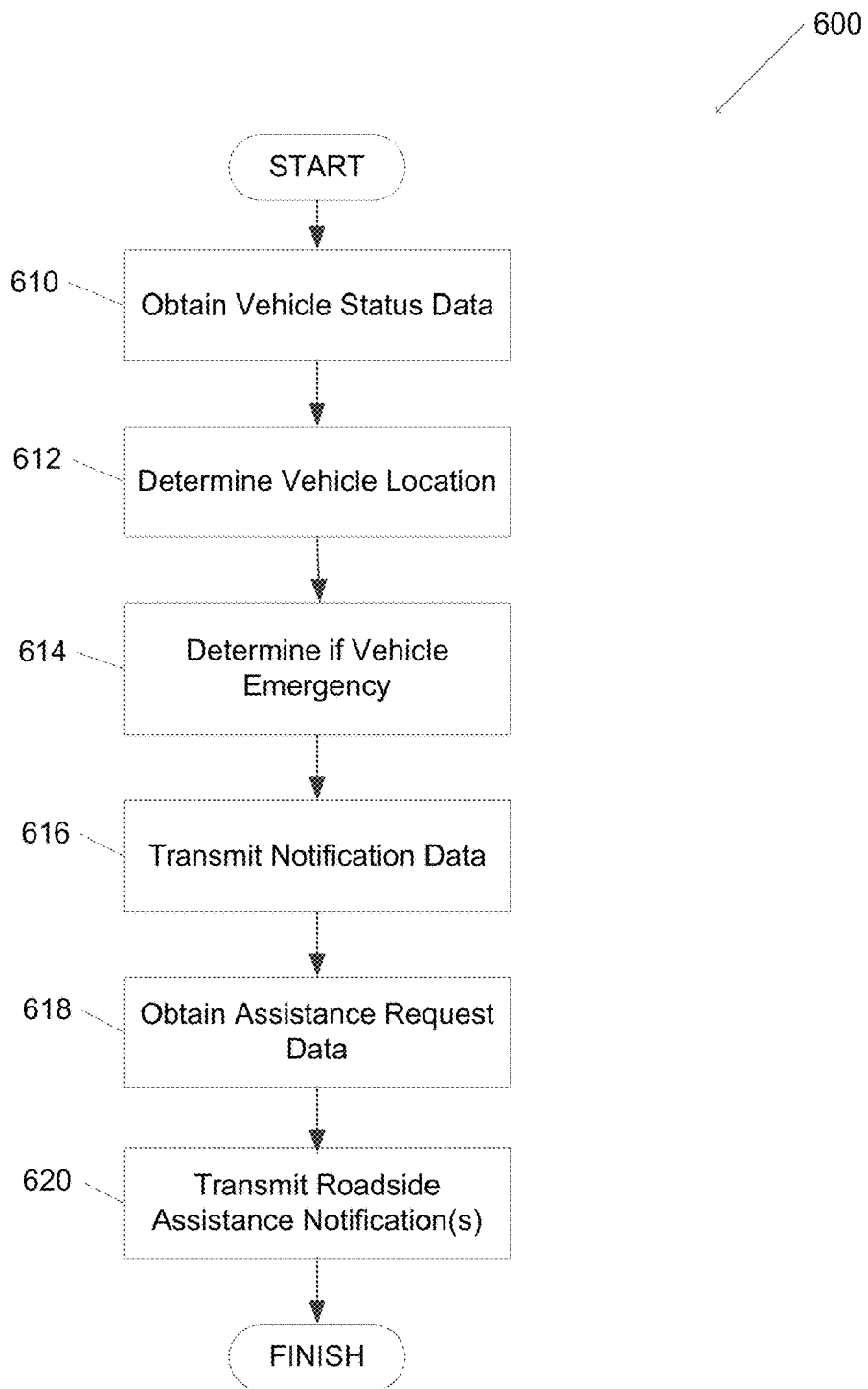
FIG. 6 illustrates a process for processing a roadside event in accordance with an embodiment of the invention.

Turning now to FIG. 6, a process for processing a roadside event in accordance with an embodiment of the invention is shown. Some or all of the steps of process 600 can be performed using any of the computing devices described herein. The process 600 includes obtaining (610) vehicle status data, determining (612) a vehicle location, determining (614) if the vehicle is experiencing an emergency event, and transmitting (616) notification data. In many embodiments, assistance request data is obtained (618) and/or roadside assistance notifications are transmitted (620).

In many embodiments, determining if a vehicle is experiencing an emergency includes determining when a vehicle stops during a trip. When the vehicle stops, an origin point can be established. In a number of embodiments, a mobile device is used to determine when a vehicle is in a trip, when the vehicle stops, and/or establish the origin point using a location determination device in the mobile device. Once a vehicle is stopped, the mobile device can be utilized to determine the location of the user. In many embodiments, the mobile device is utilized to determine the location of the user proximate to the origin point once the vehicle has been stopped for a threshold amount of time. This amount of time can be pre-determined and/or determined dynamically based on the origin point. In a number of embodiments, a geo-fence is determined based on the origin point and the location of the user can be determined relative to the geo-fence. If the user is within the geo-fence they can be considered to be staying with the car, while if they leave the geo-fence it can be determined that the user has left the vehicle. In several embodiments, map data, satellite images, and/or reverse geo-code information can be obtained from one or more third-party server systems based on the origin point. As described herein, a variety of machine learning techniques can be utilized to determine attributes of the geographic location in which the vehicle has stopped. A variety of data captured using the mobile device can also be utilized to determine conditions of the vehicle when the vehicle stopped. As described herein, these vehicle conditions can include determining if the vehicle hazard lights are on, if the vehicle has a flat tire, and/or if the vehicle pulled over in a manner consistent with an emergency stop. The usage of the mobile device and/or location of the user relative to the vehicle can also be utilized in conjunction with the condition of the vehicle in determining if the vehicle is in need of roadside assistance. In several embodiments, one or more of the above factors can be weighted and/or a confidence score can be calculate using a variety of techniques, including machine learning techniques. When the confidence score exceeds a threshold value (which can be determined dynamically and/or predetermined), a request for roadside assistance can be initiated.

Figure 7:
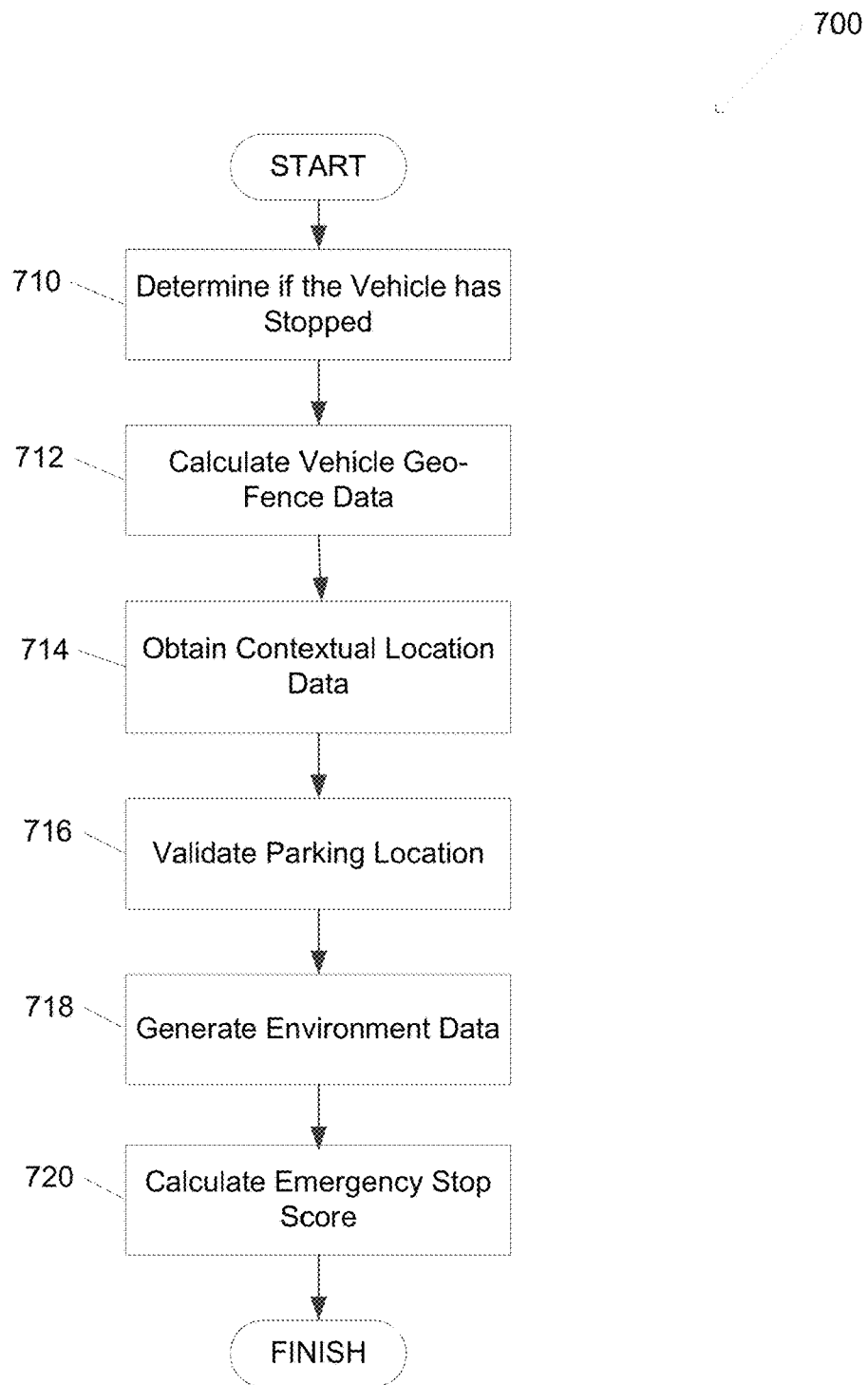
FIG. 7 illustrates a process for determining of a vehicle is experiencing an emergency in accordance with an embodiment of the invention.

Turning now to FIG. 7, a process for determining of a vehicle is experiencing an emergency in accordance with an embodiment of the invention is shown. Some or all of the steps of process 700 can be performed using any of the computing devices described herein. Process 700 includes determining (710) if a vehicle has stopped, calculating (712) vehicle geo-fence data, obtaining (714) contextual location data, validating (716) a parking location, generating (718) environmental data, and calculating (720) an emergency stop score.

Automatic Breakdown Detection

Figure 8A:
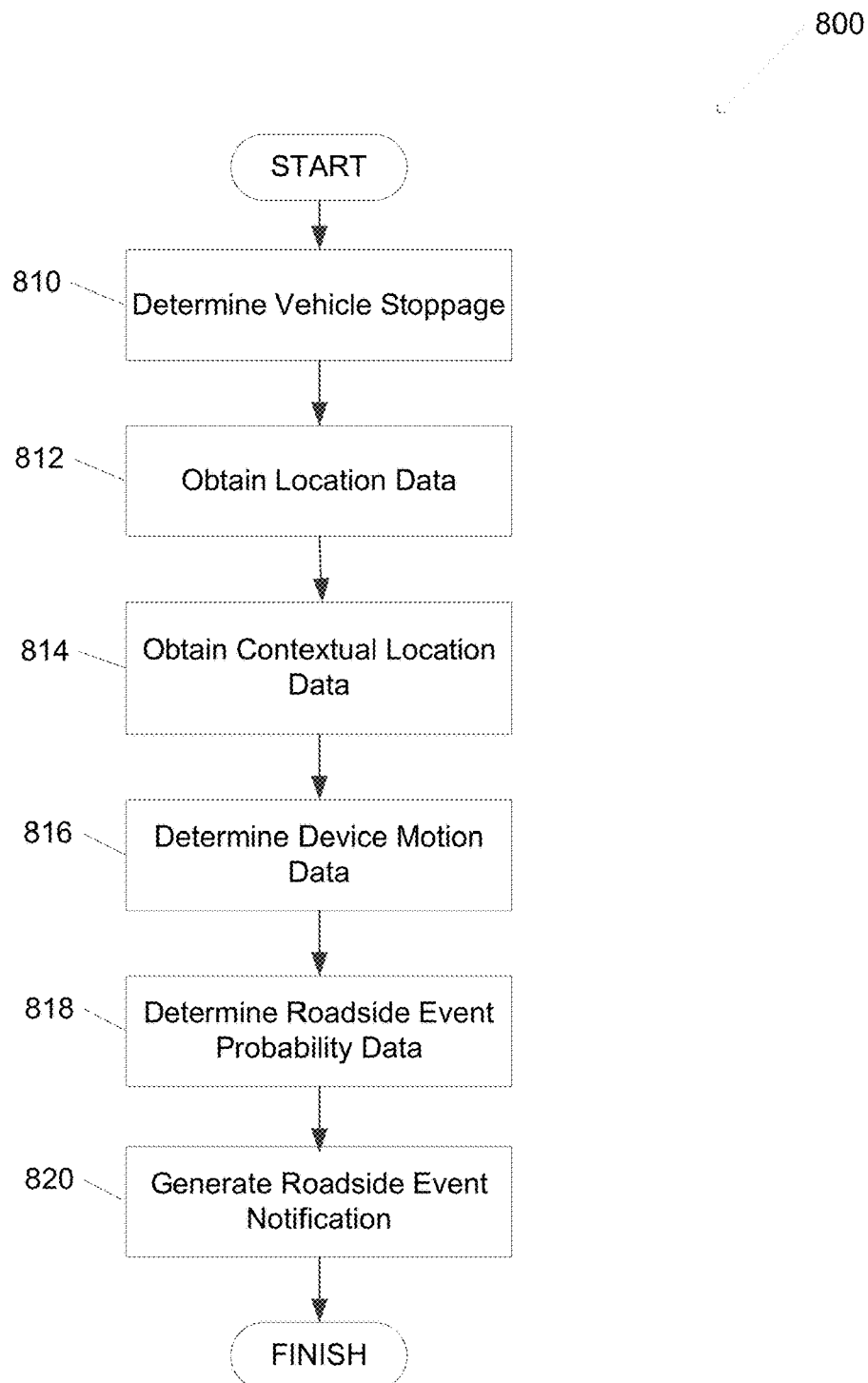
FIG. 8A illustrates a process for automatically determining a roadside event in accordance with an embodiment of the invention.

Turning now to FIG. 8A, a process for automatically detecting a roadside event in accordance with an embodiment of the invention is shown. Some or all of the steps of process 800 can be performed using any of the computing devices described herein. Process 800 can include determining (810) that a vehicle has stopped. Determining that a vehicle has stopped can include processing vehicle data obtained from a vehicle. The vehicle data can include signals or other electronic transmissions including location data, such as GPS data, and data regarding the operational state of the vehicle as described herein. In a variety of embodiments, the operational state of the vehicle can include determining if the vehicle has stopped. A vehicle stoppage can be determined by determining the rate of change of the location of the vehicle over a period of time, measuring the speed and/or acceleration of the vehicle, determining the ignition state of the vehicle, and/or any of a variety of other techniques.

Location data can be obtained (812). Location data can be obtained using any of a variety of sensors, such as a location determination device (GPS, cellular tower triangulation, etc.). The location data can be obtained from an in-vehicle location determination device, such as from a GPS receiver installed in the vehicle and/or location data obtained from a vehicle data bus, and/or from a mobile device associated with the vehicle. For example, a mobile device associated with the driver of the vehicle can be utilized to determine the location of the vehicle.

Contextual location data can be obtained (814). In a variety of embodiments, a risk map can be utilized to determine contextual location data based on the location data. The risk map can include data associated with one or more of vehicle accident data, traffic data, vehicle volume data, vehicle density data, road characteristic data, or weather data for a variety of geographical locations as described herein. In many embodiments, a database of historical vehicle data can be accessed to identify the driving habits of the vehicle. The driving habits of the vehicle can include an indication of if the vehicle is at a particular location at a particular day and/or time, the speed of the vehicle at that time and/or location, and/or any other driving behavior data.

Device motion data can be obtained (816). In several embodiments, device motion data can be obtained by measuring wireless signals transmitted by a variety of devices. The wireless signals can include any signals transmitted by a computing device at any frequency, such as Bluetooth, WiFi, NFC, cellular, etc. An indication of a wireless signal and an associated device identifier (such as a MAC address) can be captured over a period, such as one minute at a sample rate of 0.1 seconds. The presence of signals for a short amount of time (e.g. 0.1 seconds, 0.5 seconds, 1 second, etc.) can indicate a moving wireless device and the amount of time the wireless device remains in range can be used to calculate the rate at which the wireless device is traveling. In many embodiments, a wireless signal may be transmitted at a known frequency and received at a second frequency. The difference between the known frequency and the received frequency can be used to calculate the Doppler shift of the wireless signal, which can be used to determine the rate at which the wireless device is moving. In a number of embodiments, the nodes in a V2V communication system can transmit messages indicating the rate at which the node is moving along with an identifier of the node. The V2V message can be received and the rate can be obtained from the received message.

The probability that the vehicle is experiencing a roadside event can be determined (818). The probability can be calculated based on the location of the vehicle, the contextual location of the vehicle, and/or the speed at which other vehicles are travelling. For example, if a vehicle is stopped in a parking lot with few vehicles moving by, the vehicle is likely not experiencing a roadside event. In another example, if a vehicle is traveling slowly on a road with a high speed limit, such as a highway, and other vehicles are traveling much faster than the vehicle, such as having a speed difference over a threshold value, the vehicle is likely experiencing a roadside event even if the vehicle has not fully stopped. In a variety of embodiments, a machine classifier can be used to generate feature vectors classifying the status of a vehicle along with a probability indicating the confidence in the classified status. The status of the vehicle can be indicated using any label, such as normal operation or experiencing a roadside event. The classification of the vehicle status may be verified based on feedback obtained based on a notification generated and/or transmitted as described herein. The machine classifiers may be trained using a set of training data comprising a set of labels indicating roadside events and a mapping of the labels to a set of locations, contextual location data, and/or device motion data.

A roadside event notification can be generated (820). Notifications can be generated when a vehicle is experiencing a roadside event and the probability exceeds a threshold value. The threshold value can be pre-determined and/or determined automatically. A variety of techniques that can be used to determine the threshold probability a vehicle is experiencing a roadside event are described in more detail with respect to FIG. 8B. Notifications, such as those described herein, can be generated and indicate the vehicle, the occupants of the vehicle, the location of the vehicle, the roadside event, and/or any other data. The notifications can be provided to a user, the user's contacts, an insurance company, a roadside assistance provider, and/or any other notification target.

Determining Threshold Probabilities

A vehicle can experience a variety of conditions during a trip, such as being stuck in traffic, waiting for a train to cross an intersection, and a variety of other unscheduled stops that do not correspond to a roadside event requiring roadside assistance. In a variety of embodiments, a threshold probability indicating the likelihood that a stoppage at a particular location can be determined based on the specific characteristics of the vehicle's environment. In this way, the ability of a roadside assistance system to identify roadside events and provide roadside assistance can be improved by automatically determining a probability that a stoppage historically corresponds to a roadside event.

Figure 8B:
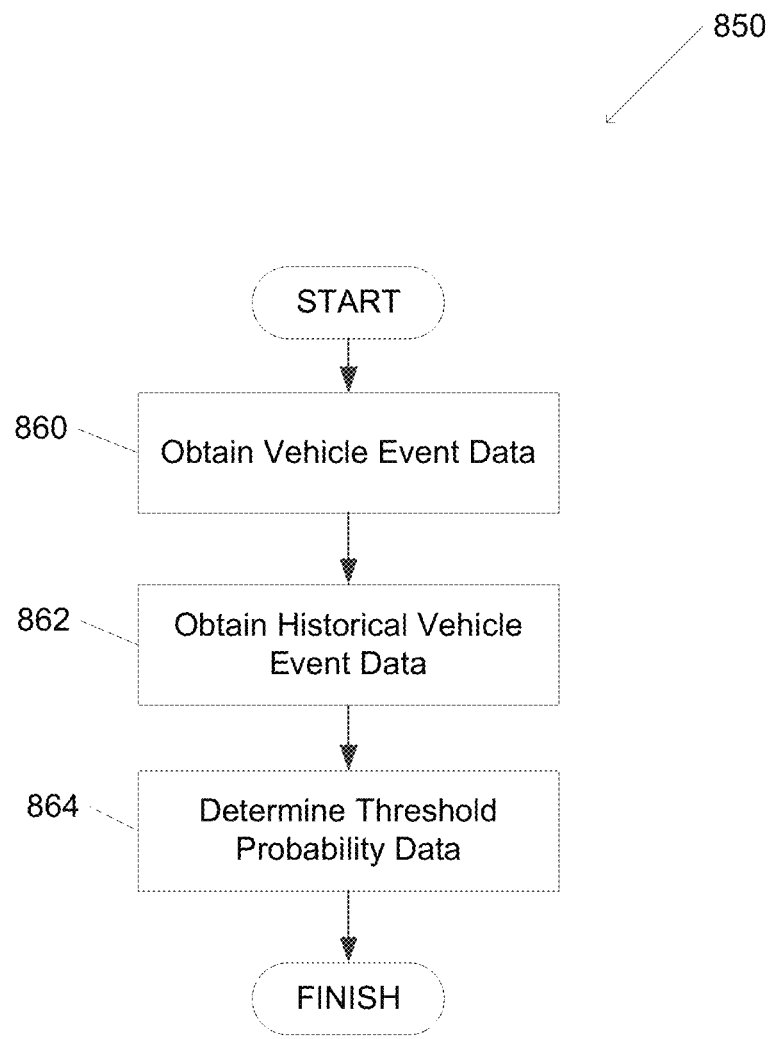
FIG. 8B illustrates a process for generating a threshold probability that a vehicle is experiencing a roadside event in accordance with an embodiment of the invention.

Turning now to FIG. 8B, a process for determining a threshold probability that a vehicle is experiencing a roadside event in accordance with an embodiment of the invention is shown. Some or all of the steps of process 850 can be performed using any of the computing devices described herein. Process 850 can include obtaining (860) vehicle event data. The vehicle event data can include any of a variety of data described herein, such as vehicle data describing the operational state of the vehicle, location data describing the location of the vehicle, contextual location data describing the area in which the vehicle is located at a particular time, and/or device motion data describing the motion of wireless devices within communication range of the vehicle.

Historical roadside event data can be obtained (862). The historical roadside event data can indicate previous vehicle stoppages in a particular location along with an indication of if the vehicle experienced a roadside event. The historical event data can also include a variety of data describing the operational state of the vehicle, location data, time data, device motion data, or any other data described herein at the time the vehicle was stopped. In many embodiments, the historical roadside event data is stored and/or obtained using a risk map. For example, the historical roadside event data can include a number of vehicles being stopped at a particular intersection at 8:32 am with a large number of wireless devices passing by at a high rate of speed. The contextual location data describing the intersection can indicate that train tracks cross the intersection, there is a train that crosses the intersection at 8:30 am every day, and the train takes ten minutes to travel through the intersection. Accordingly, vehicles typically stop at the intersection for an extended period of time but are not experiencing a roadside event. In this example, a vehicle stopped at the intersection can turn off its engine as the vehicle will be waiting for an extended period of time, but the vehicle is not experiencing a roadside event. In a second example, the historical roadside event data can indicate a portion of a lightly-traveled highway where vehicles typically stop late at night. The contextual location data can indicate that the quality of the road surface is quite poor, so vehicles stopped at the location at night are likely to be stopped due to a flat tire caused by not seeing large potholes in the road at night.

Threshold probability data can be determined (864). The threshold probability data can indicate the likelihood that a vehicle stopped at a particular location and at a particular time is experiencing a roadside event. Any of the features of the vehicle event data and/or historical event data can be used to determine the threshold probability data. In a variety of embodiments, the threshold probability data can be determined by calculating the ratio of the number of vehicles stopped at a particular location at a particular time to the number of vehicles that experienced a roadside event during the stoppage. For example, if four cars stop at a particular location and three of those cars experienced a roadside event, the threshold probability that a vehicle stopped at the location is 75%. In a number of embodiments, the threshold probability data can be determined by calculating a breakdown score for each vehicle based on the features of the stoppage as described in the historical vehicle event data. In several embodiments, a weight can be assigned to one or more features of the historical vehicle event data and the breakdown score can be calculated based on the weighted features. The breakdown scores can be correlated with the associated indication of a roadside event occurring for each vehicle to calculate a statistical distribution indicating a probabilistic likelihood of a vehicle experiencing a roadside event. The statistical distribution can be used to determine the threshold probability data for a stoppage at a particular location and/or at a particular time. In this way, the threshold probability data can provide an automatically determined threshold that a particular stoppage described in the vehicle event data describes a vehicle experiencing a roadside event.

User Interfaces

Figure 9A:
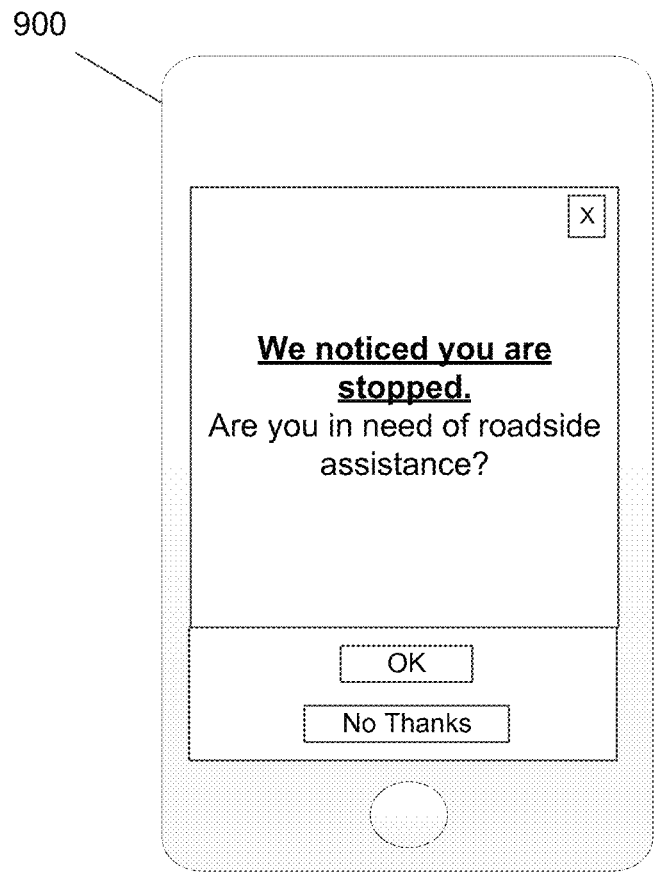

FIG. 9A illustrates one example user interface including a notification of the first type. The interface 900 is one example of a notification and additional or alternative information can be provided in a first notification without departing from the invention. Interface 900 includes an indication that a roadside event has occurred in a location where roadside assistance can be desired. In addition, the interface 900 requests a confirmation for a request for roadside assistance to be made. If a user does not wish to accept the requested roadside assistance (e.g., can repair the issue themselves, has already requested assistance, or the like), the user can select "No Thanks" option and the system will transmit an instruction cancelling the requested roadside assistance.

FIG. 9B illustrates an example user interface 950 including a second type of notification. The second type of notification can include one or more selections available to the user. For example, the second type of notification 950 can include a request for the user to confirm that everyone is OK, a selectable offer for the system to request roadside assistance, and/or a selectable option to view additional information about an area surrounding the location (e.g., food, lodging, points of interest, and the like). More or fewer options can be provided to the user as appropriate to the requirements of specific applications of embodiments of the invention. The election of one or more options available via user interface 950 can cause display of a second user interface having additional information, offers for assistance, or the like.

Figure 9C:
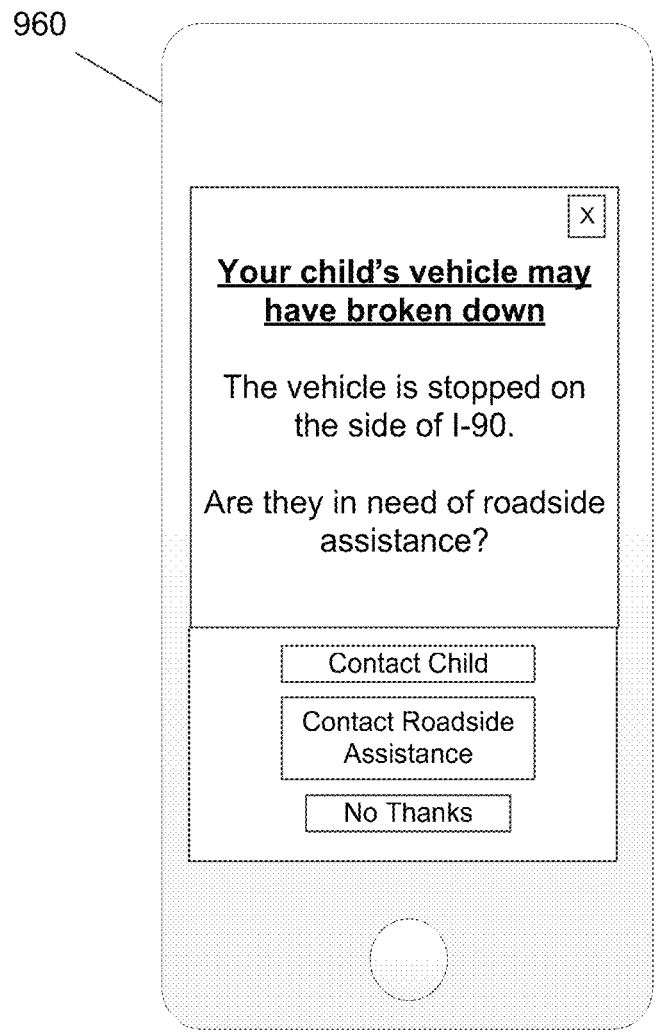

FIG. 9C illustrates an example user interface 960 including a third type of notification. The third type of notification can include a notification that a third party (e.g. a friend, family member, co-worker, etc.) has experienced a roadside event and could be in need of roadside assistance. Interface 960 includes an indication that a roadside event has occurred in a location where roadside assistance would likely be needed and an identification of a user associated with the vehicle experiencing the roadside event. In addition, the interface 960 provides options to contact the user and/or request roadside assistance. If a user does not wish to accept the requested roadside assistance (e.g., can repair the issue themselves, has already requested assistance, or the like), the user can select "No Thanks" option and the system will transmit an instruction cancelling the requested roadside assistance.

As discussed herein, the systems, arrangements, methods and the like, described herein provide an efficient and accurate system for monitoring vehicles to detect issues that have caused the vehicle to stop. In some arrangements, the system can receive and/or process data in real-time in order to effectively and accurately identify vehicles that are stopped, determine a reason for stopping, and the like.

In some examples, a user can register their vehicle in order to engage the monitoring aspect of the system. Registration can be performed via an online or mobile application executing one or more computing devices. Registration can include a user providing information about the vehicle (e.g., make, model, year, etc.), potential drivers (e.g., name, contact information, and the like). In some examples, the registration process can also include options for initiating the processes or systems described herein. For example, the registration process can include an option for "always on" which means the system can monitor the vehicle at all times to detect when the vehicle is on a highway, etc. In other examples, the user can select to have the system activate or initiate upon detecting a speed of the vehicle above a predetermined threshold (e.g., greater than 40 MPH, 50 MPH, 60 MPH, or the like, for a predetermined time). In another example, the system can activate or initiate upon a vehicle location being detected as on a highway or upon navigation information indicating that a user will be using a highway along a predetermined route. In still another example, a user can manually activate the system when approaching or planning to drive on a highway (e.g., via an online or mobile application). Various other arrangements for activating or initiating the system can be used without departing from the invention.

The arrangements described herein provide for receiving and processing data in real-time to efficiently and accurately detect stopped vehicles, determine whether the vehicle is stopped for an urgent or non-urgent situation reason, and provide assistance accordingly.

Various aspects described herein can be embodied as a method, an apparatus, or as one or more computer-readable media storing computer-executable instructions. Accordingly, those aspects can take the form of an entirely hardware embodiment, an entirely software embodiment, or an embodiment combining software and hardware aspects. Any and/or all of the method steps described herein can be embodied in computer-executable instructions stored on a computer-readable medium, such as a non-transitory computer readable medium.

Any and/or all of the method steps described herein can be embodied in computer-readable instructions stored in the memory of an apparatus that includes one or more processors, such that the apparatus is caused to perform such method steps when the one or more processors execute the computer-readable instructions. In addition, various signals representing data or events as described herein can be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures can be performed in other than the recited order, and that one or more steps illustrated can be optional in accordance with aspects of the disclosure. Further, one or more aspects described with respect to one figure or arrangement can be used in conjunction with other aspects associated with another figure or portion of the description.

What is claimed is:

1. A method comprising:
   obtaining vehicle data associated with a vehicle;
   determining the vehicle has stopped using the vehicle data;
   determining a location where the vehicle has stopped;
   determining contextual location data associated with the location, the contextual location data including a risk map indicative of historical roadside event data, the risk map comprising at least one of vehicle accident data, traffic speed data, vehicle volume data, vehicle density data, road characteristic data, or weather data;
   determining whether roadside assistance is needed for the vehicle using the contextual location data;
   generating a user interface including a notification and one or more user selectable inputs to request the roadside assistance; and
   transmitting the user interface to a mobile device associated with the vehicle to cause the mobile device to present the user interface.

2. The method of claim 1, wherein the notification includes an indication that the vehicle has stopped.

3. The method of claim 1, wherein the mobile device is disposed outside of the vehicle.

4. The method of claim 3, wherein the one or more user selectable inputs include an option to communicate with a third party.

5. The method of claim 1, wherein the one or more user selectable inputs include an option to decline the roadside assistance.

6. The method of claim 1, wherein the notification includes an indication of the location of the vehicle.

7. The method of claim 1, wherein the vehicle data is acquired by the mobile device.

8. A system comprising:
- a processor; and
- a memory in communication with the processor, the memory including instructions that, when executed by the processor, cause the system to:
  - receive vehicle data associated with a vehicle;
  - determine the vehicle ceased moving using the vehicle data;
  - determine a location where the vehicle has stopped;
  - determine contextual location data associated with the location, the contextual location data including a risk map indicative of historical roadside event data, the risk map comprising at least one of vehicle accident data, traffic speed data, vehicle volume data, vehicle density data, road characteristic data, or weather data;
  - determine whether roadside assistance is needed for the vehicle using the contextual location data;
  - generate a user interface including a notification and one or more user selectable inputs to request the roadside assistance; and
  - transmit the user interface to a mobile device associated with the vehicle to cause the mobile device to present the user interface.

9. The system of claim 8, wherein the notification indicates that the vehicle has ceased moving.

10. The system of claim 8, wherein the mobile device is remote from the vehicle.

11. The system of claim 10, wherein the one or more user selectable inputs include an option to communicate with a third party.

12. The system of claim 8, wherein the one or more user selectable inputs include an option to decline the roadside assistance.

13. The system of claim 8, wherein the notification indicates the location of the vehicle.

14. The system of claim 8, wherein the vehicle data is collected by the mobile device.

15. A non-transitory computer-readable medium storing instructions for controlling a processor, the instructions causing the processor to perform steps comprising:
- receiving vehicle data associated with a vehicle;
- determining the vehicle is not moving using the vehicle data;
- determining a location where the vehicle has stopped;
- determining contextual location data associated with the location, the contextual location data including a risk map indicative of historical roadside event data, the risk map comprising at least one of vehicle accident data, traffic speed data, vehicle volume data, vehicle density data, road characteristic data, or weather data;
- determining whether roadside assistance is needed for the vehicle using the contextual location data
- generating a user interface including a notification and one or more user selectable inputs to request the roadside assistance; and
- transmitting the user interface to a mobile device associated with the vehicle to cause the mobile device to present the user interface.

16. The non-transitory computer-readable medium of claim 15, wherein the notification indicates that the vehicle is not moving.

17. The non-transitory computer-readable medium of claim 15, wherein the mobile device is not within the vehicle.

18. The non-transitory computer-readable medium of claim 15, wherein the one or more user selectable inputs include an option to communicate with a third party.

19. The non-transitory computer-readable medium of claim 15, wherein the one or more user selectable inputs include an option to decline the roadside assistance.

20. The non-transitory computer-readable medium of claim 15, wherein the notification indicates the location of the vehicle.

* * * * *